(12) United States Patent
Saito

(10) Patent No.: US 11,579,823 B2
(45) Date of Patent: Feb. 14, 2023

(54) SERVER SYSTEM FOR GENERATING INFORMATION RELATED TO A CONSUMABLE ITEM FOR BUSINESS-USE PRINTING

(71) Applicant: CANON KABUSHIKI KAISHA, Tokyo (JP)

(72) Inventor: Kazuyuki Saito, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/404,315

(22) Filed: Aug. 17, 2021

(65) Prior Publication Data
US 2022/0057973 A1    Feb. 24, 2022

(30) Foreign Application Priority Data

Aug. 24, 2020  (JP) .............................. JP2020-141122

(51) Int. Cl.
| | |
|---|---|
| G06F 15/00 | (2006.01) |
| G06F 3/12 | (2006.01) |
| G06K 1/00 | (2006.01) |
| G06Q 10/087 | (2023.01) |

(52) U.S. Cl.
CPC .......... *G06F 3/1229* (2013.01); *G06F 3/1204* (2013.01); *G06F 3/1236* (2013.01); *G06F 3/1292* (2013.01); *G06Q 10/087* (2013.01)

(58) Field of Classification Search
CPC .... G06F 3/1229; G06F 3/1204; G06F 3/1236; G06F 3/1292
USPC .............................. 358/1.15, 1.14, 1.13, 1.1
See application file for complete search history.

(56) References Cited

U.S. PATENT DOCUMENTS

| | | | | |
|---|---|---|---|---|
| 8,082,323 | B2 * | 12/2011 | Yamaguchi | H04L 67/306 709/219 |
| 2009/0033974 | A1 * | 2/2009 | Nishimi | G06Q 10/087 358/1.14 |
| 2013/0242342 | A1 * | 9/2013 | Kawakami | H04N 1/00307 358/1.15 |
| 2017/0090830 | A1 * | 3/2017 | Tomono | G06F 3/1285 |
| 2020/0151778 | A1 * | 5/2020 | Nakamura | B29C 64/386 |
| 2021/0356936 | A1 * | 11/2021 | Park | B33Y 50/00 |

FOREIGN PATENT DOCUMENTS

JP          2014089648 A        5/2014

* cited by examiner

*Primary Examiner* — Douglas Q Tran
(74) *Attorney, Agent, or Firm* — Canon U.S.A., Inc. IP Division

(57) ABSTRACT

A server system connectable to a print system including a transmission unit configured to transmit received print data to a printer includes an acquisition unit configured to acquire information indicating an amount of a consumable which is used for printing of transmitted print data to the printer, and a placement unit configured to place an order for the consumable to be used by the printer, based on the acquired information.

24 Claims, 22 Drawing Sheets

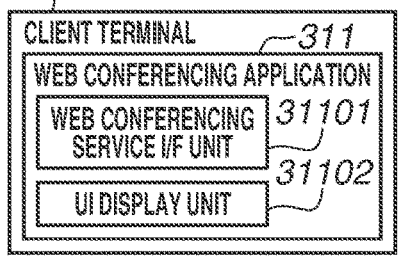
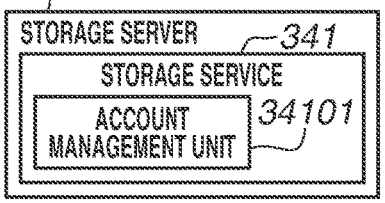
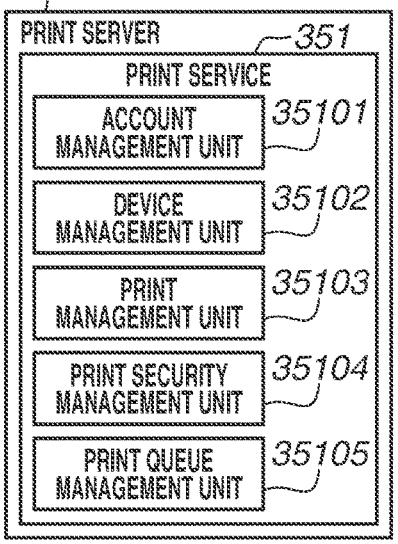
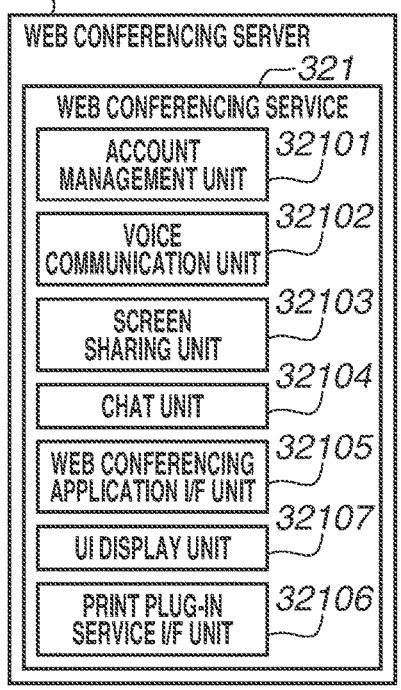
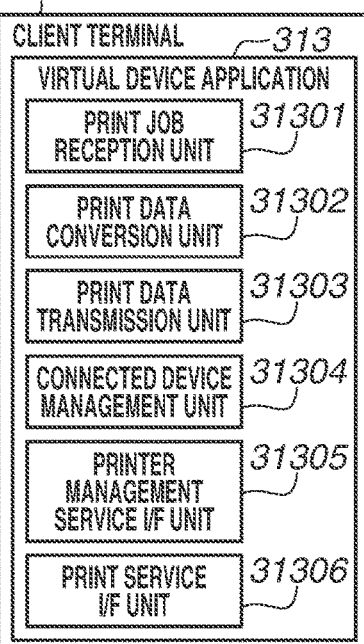
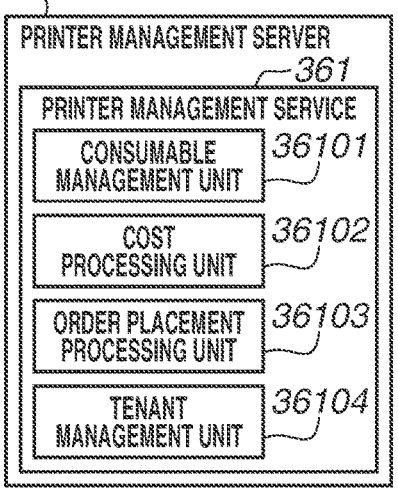
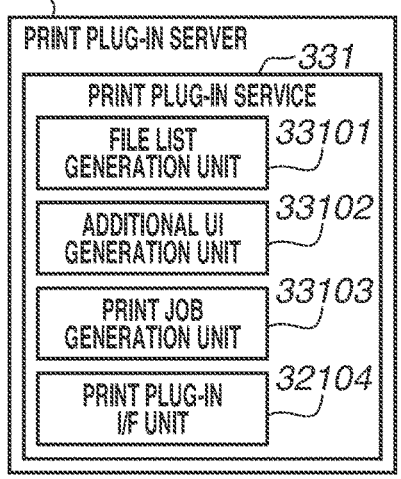
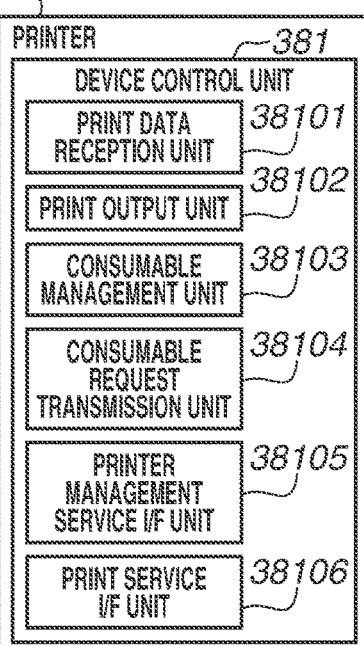
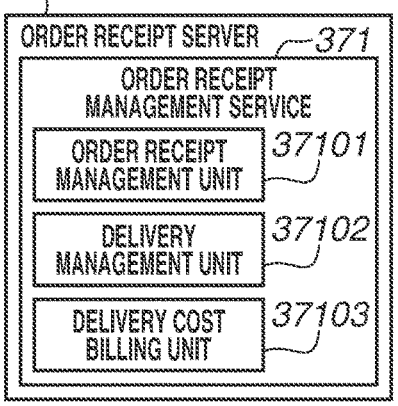

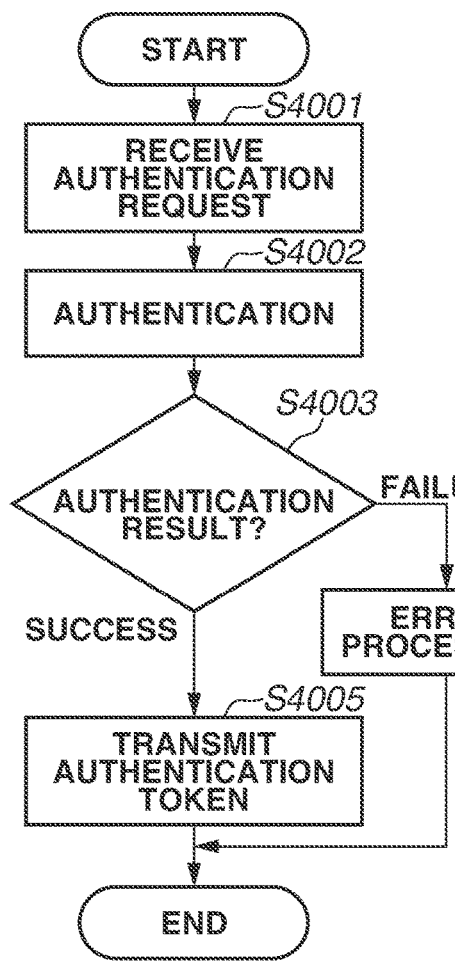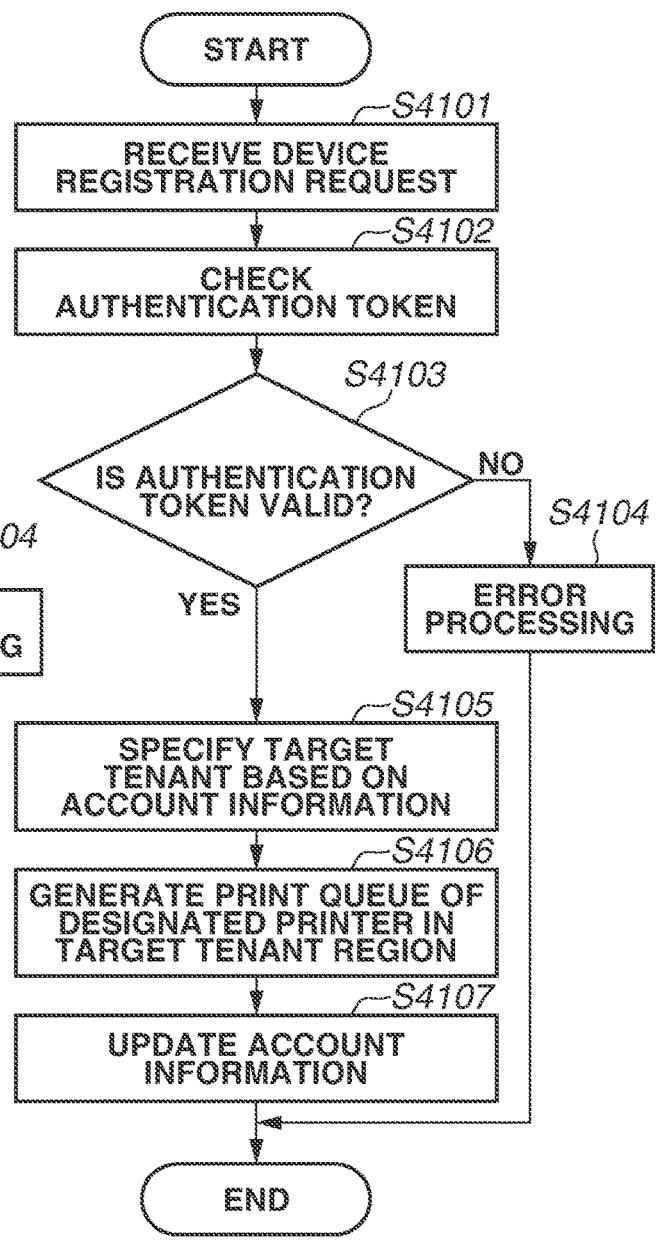

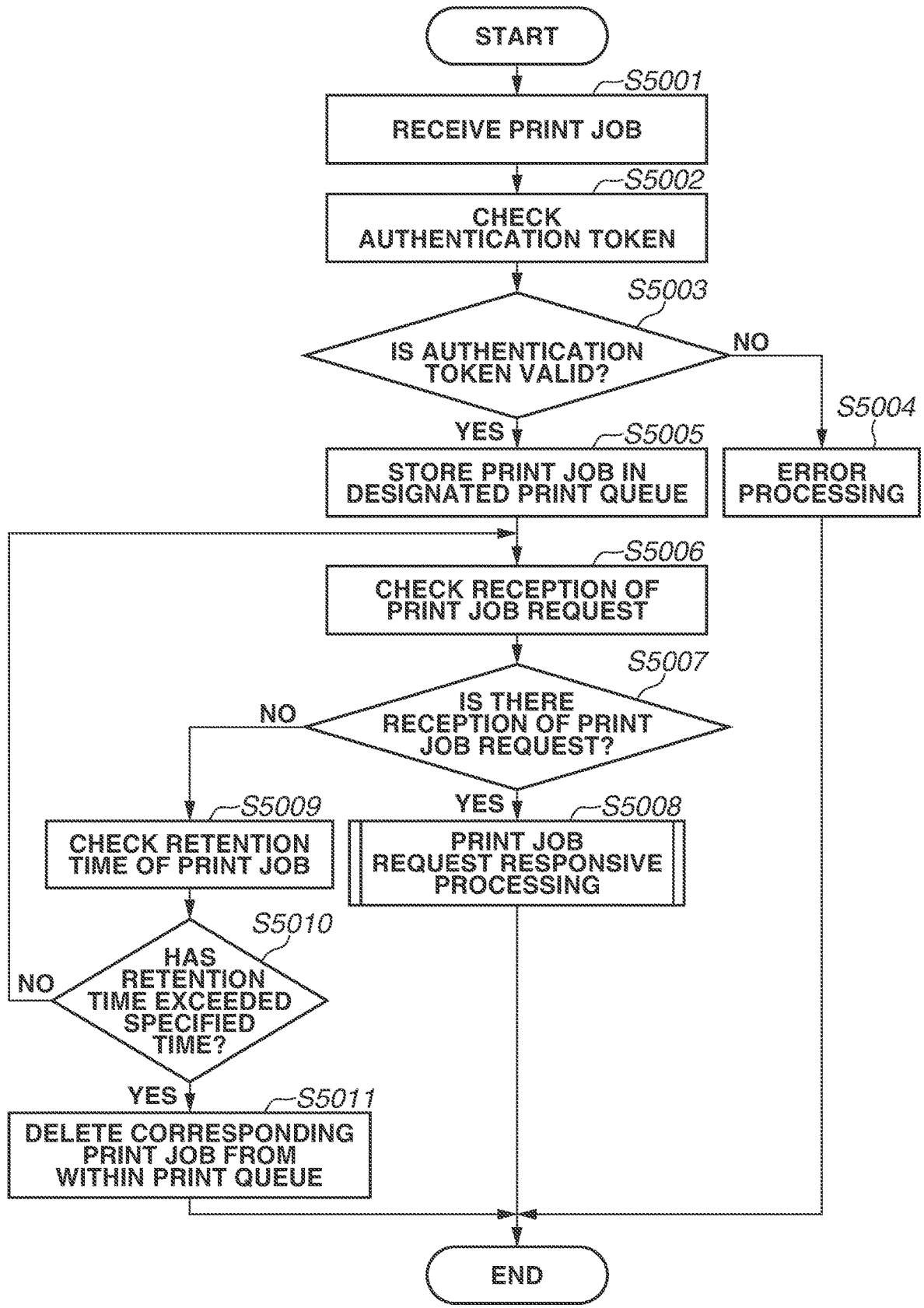

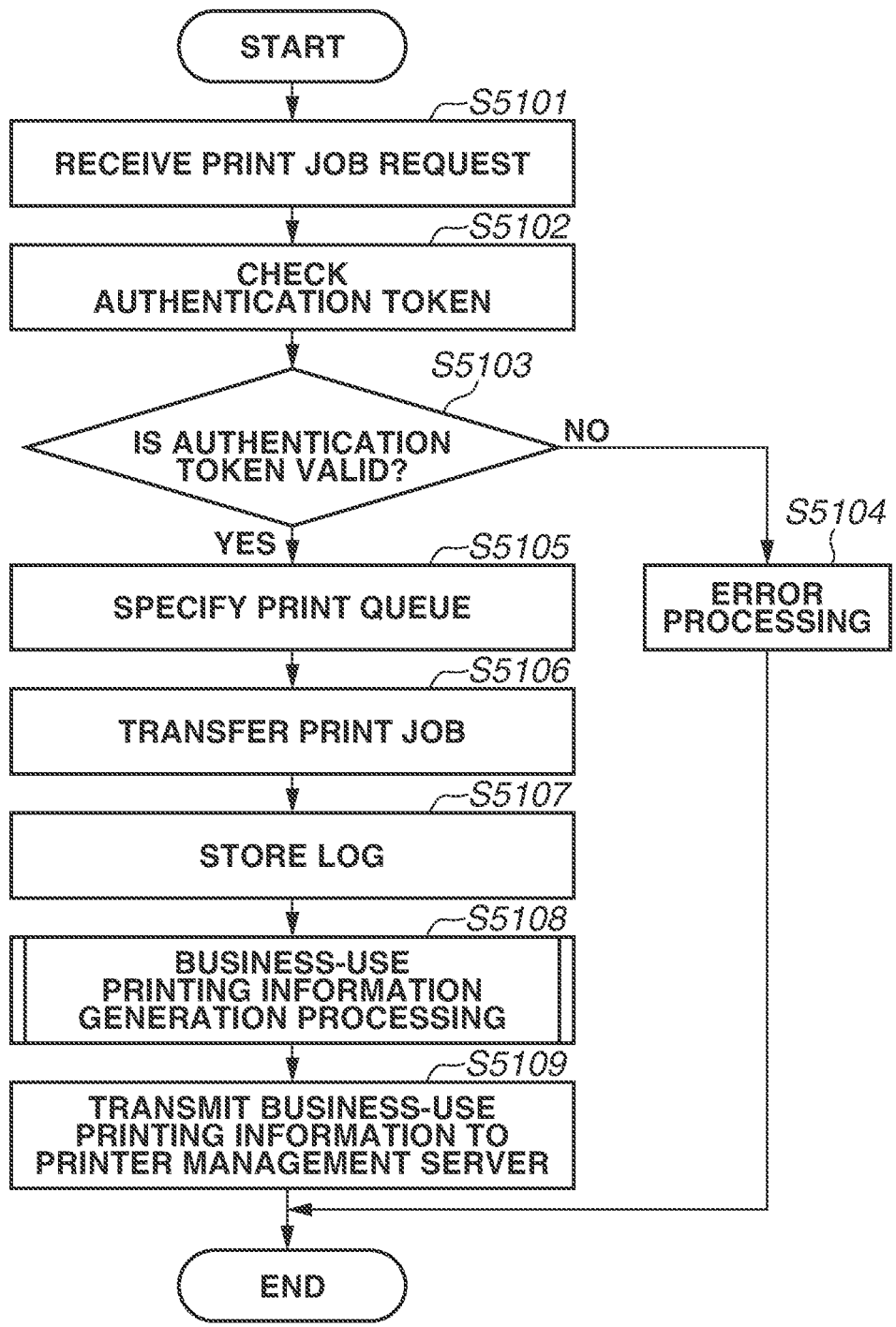

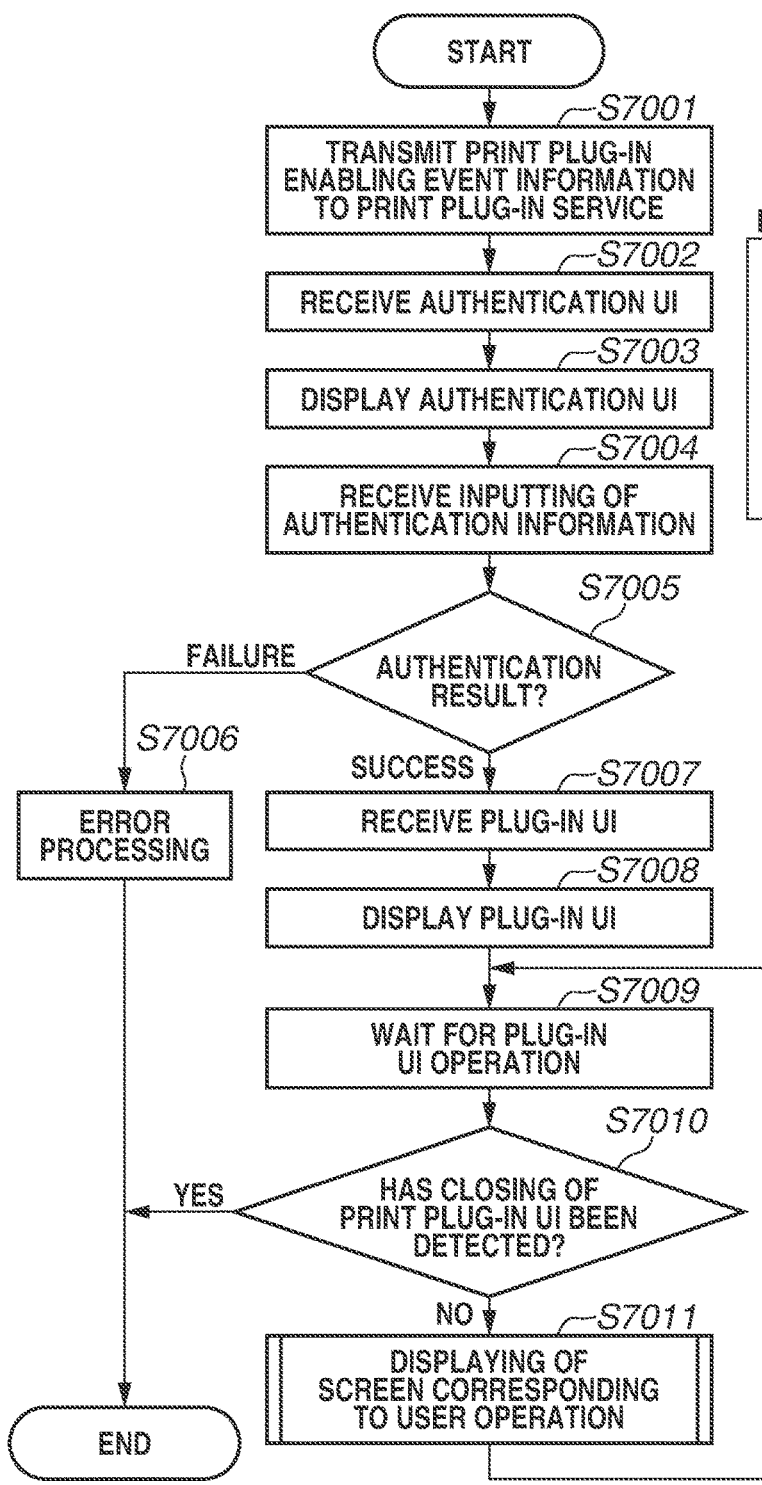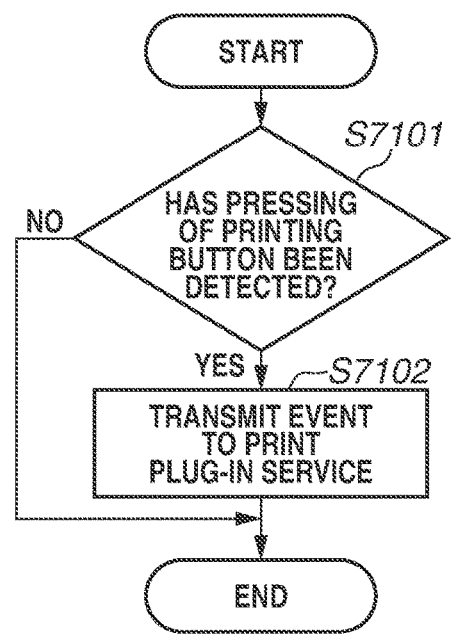

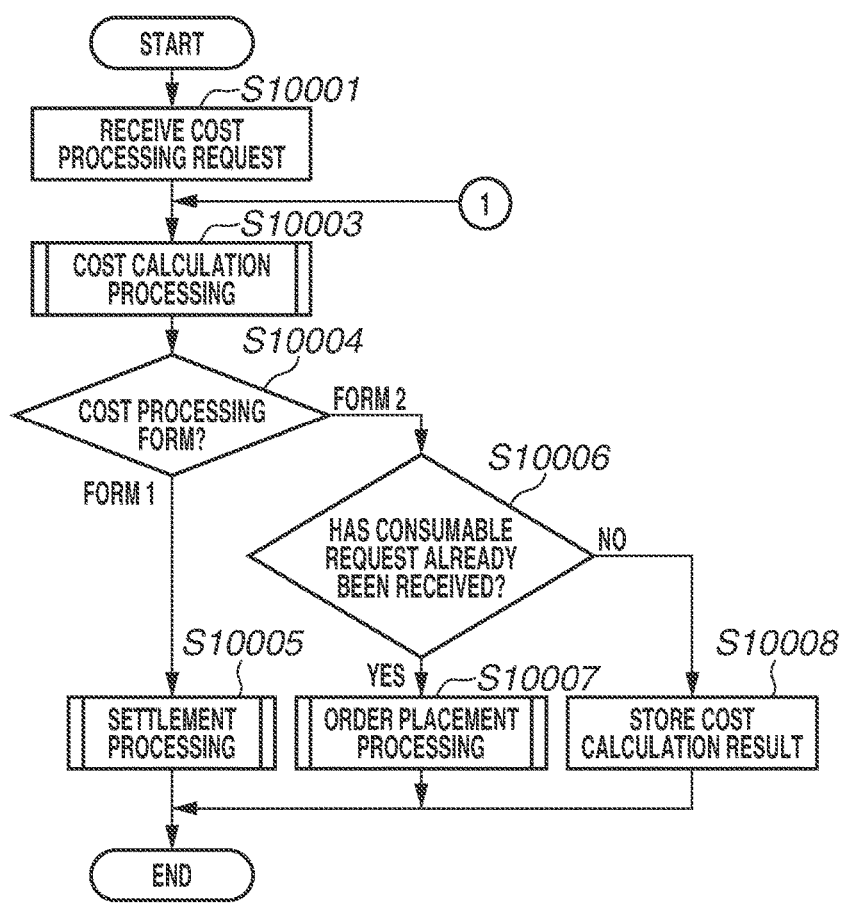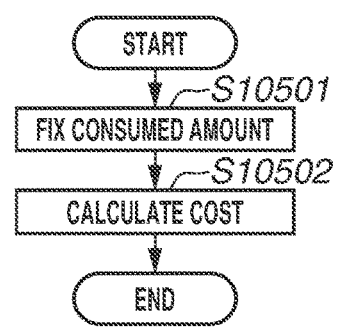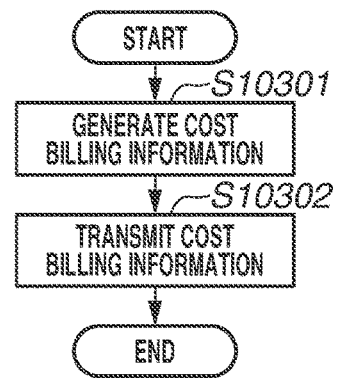

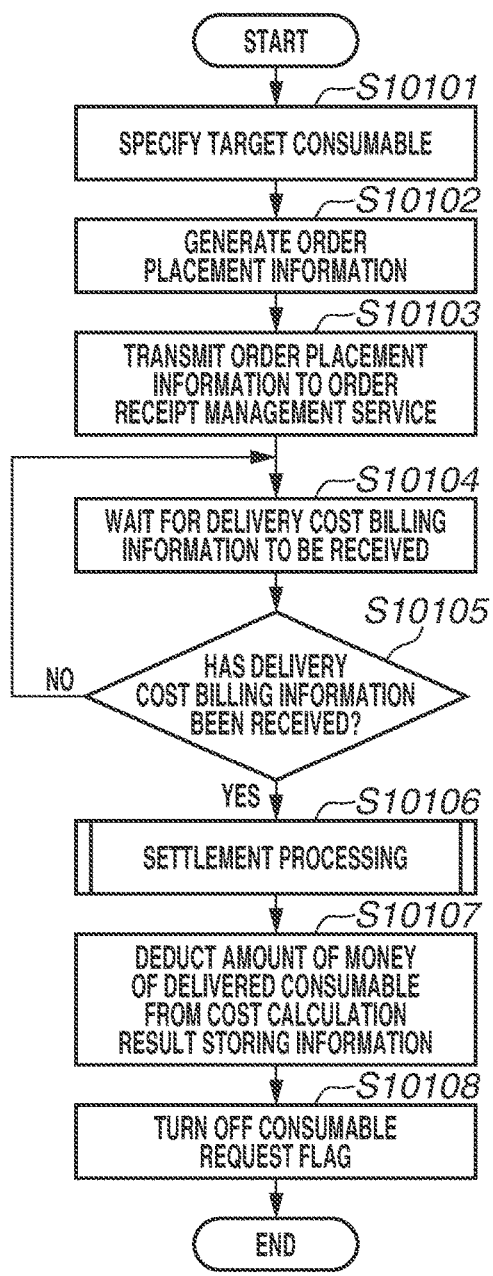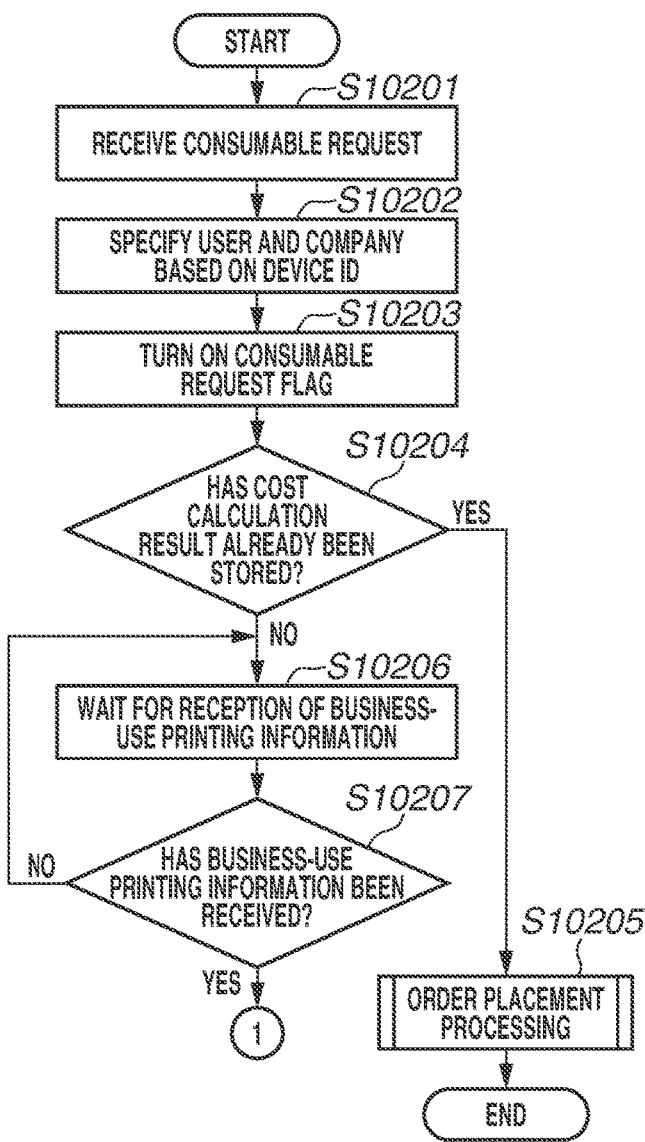

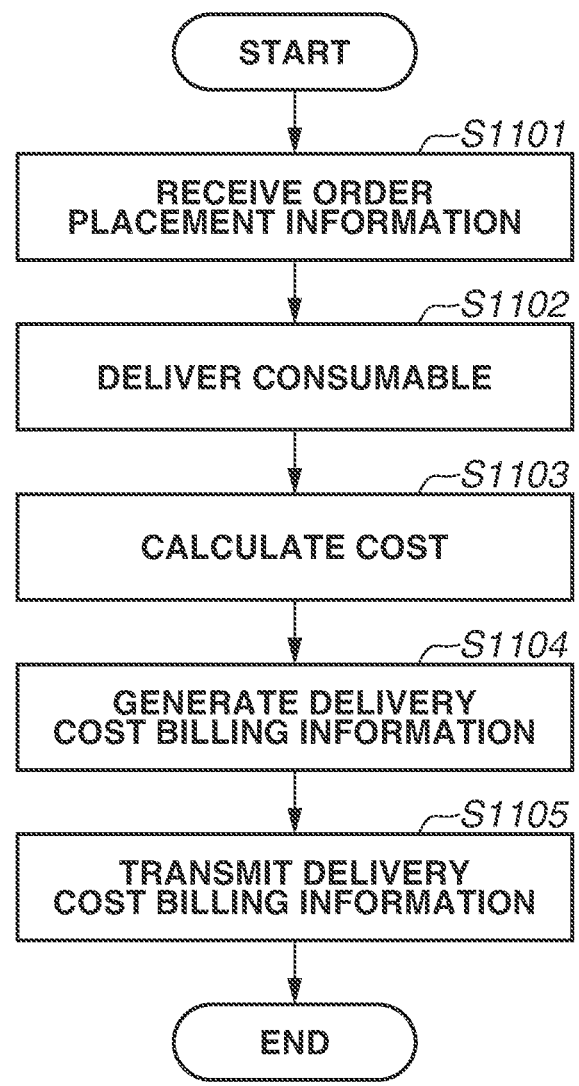

FIG.12A

| ACCOUNT INFORMATION |
| --- |
| USER ID |
| TENANT ID |
| DEVICE ID |
| PRINT QUEUE ID |
| TOKEN |

FIG.12B

| BUSINESS-USE PRINTING INFORMATION |
| --- |
| BUSINESS-USE PRINTING INFORMATION ID |
| TENANT ID |
| DEVICE ID |
| USER ID |
| NUMBER OF CONSUMED SHEETS OF PAPER |
| INK/TONER CONSUMED AMOUNT |

FIG.12C

| LOG INFORMATION |
| --- |
| DEVICE ID |
| TENANT ID |
| USER ID |
| JOB PULLOUT DATE AND TIME |
| PRINT DATA NAME |
| PRINT NUMBER OF PAGES |
| THUMBNAIL |

FIG.12D

| ORDER PLACEMENT INFORMATION |
| --- |
| DEVICE ID |
| TENANT ID |
| DELIVERY LOCATION ADDRESS |
| DELIVERY CONSUMABLE |
| DELIVERY CONSUMABLE AMOUNT |

FIG.12E

| DELIVERY COST BILLING INFORMATION |
| --- |
| DEVICE ID |
| TENANT ID |
| USER ID |
| CONSUMABLE |
| CONSUMABLE AMOUNT |
| CONSUMABLE COST |
| DELIVERY LOCATION ADDRESS |
| SHIPPING COST |
| TOTAL COST |

FIG.12F

| DEVICE INFORMATION (PRINT SERVICE) |
| --- |
| DEVICE ID |
| TENANT ID |
| USER ID |

FIG.12G

| DEVICE INFORMATION (PRINT MANAGEMENT SERVICE) |
| --- |
| USER ID |
| TENANT ID |
| DEVICE ID |
| COST PROCESSING FORM |
| DELIVERY LOCATION ADDRESS |
| INK/TONER TYPE |
| PAPER TYPE |

FIG.12H

| TENANT INFORMATION |
| --- |
| TENANT ID |
| COMPANY NAME |
| DEVICE ID LIST |
| USER ID LIST |

FIG.12I

| CONSUMABLE REQUEST INFORMATION |
| --- |
| DEVICE ID |
| TARGET CONSUMABLE |

FIG.12J

| COST BILLING INFORMATION |
| --- |
| DEVICE ID |
| TENANT ID |
| USER ID |
| CONSUMABLE |
| CONSUMED AMOUNT OF CONSUMABLE USED FOR BUSINESS |
| COST OF CONSUMABLE USED FOR BUSINESS |
| TOTAL COST |

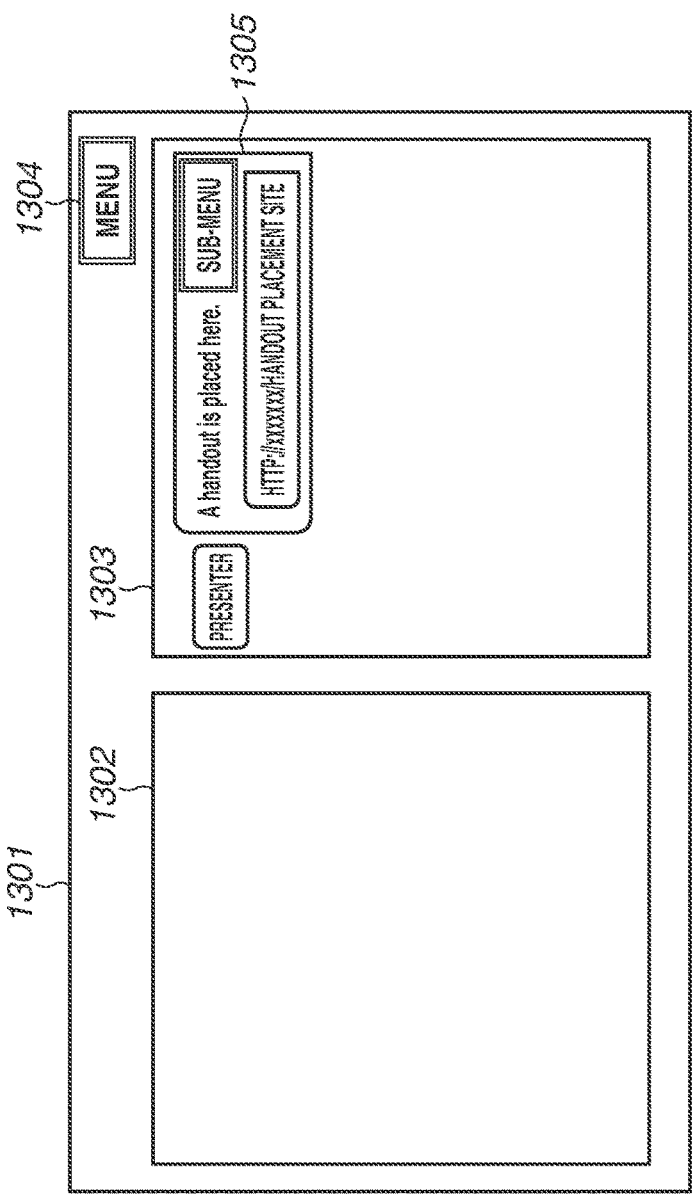
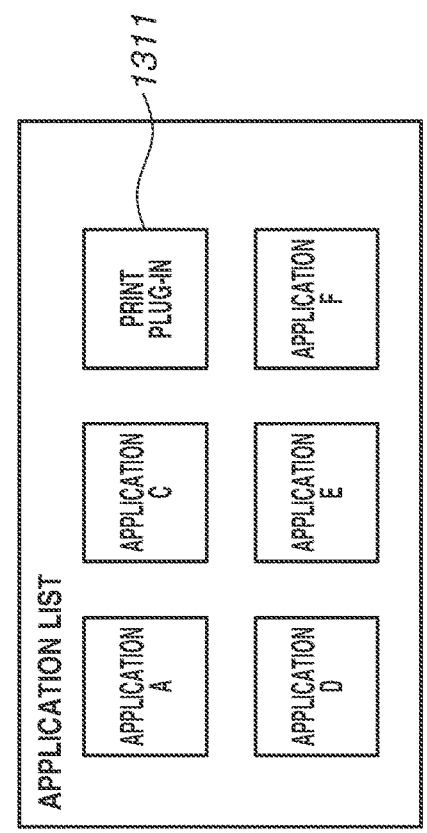
FIG. 13A
FIG. 13B
FIG. 13C

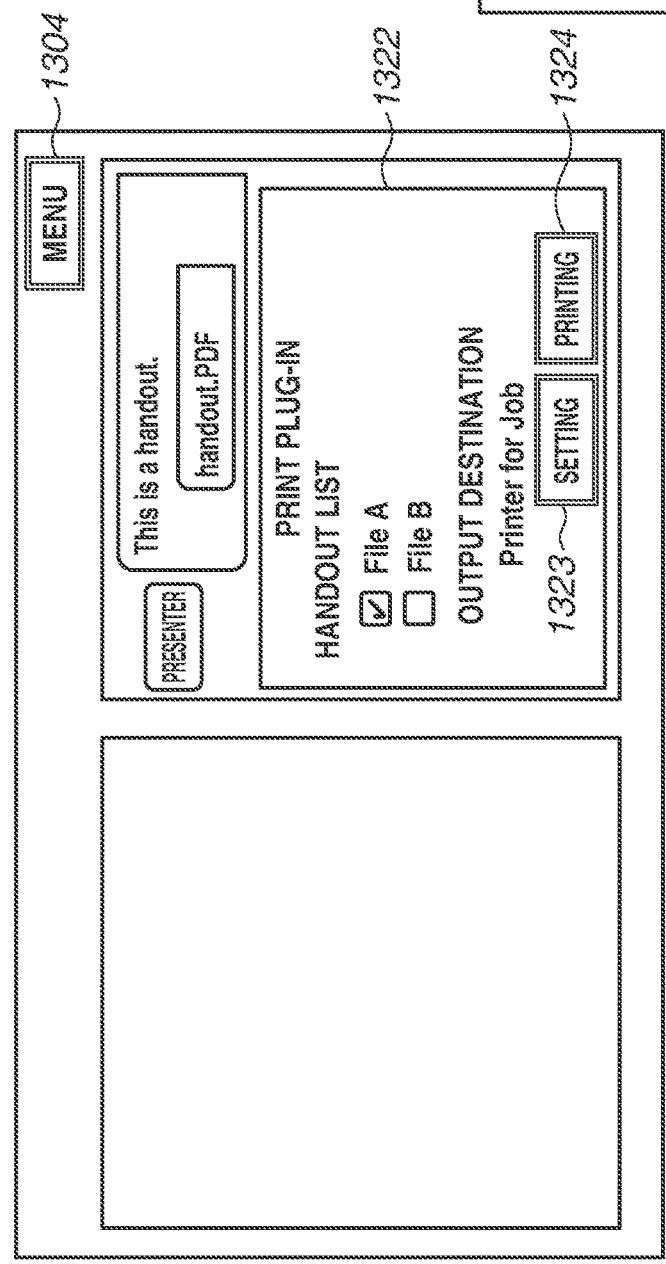
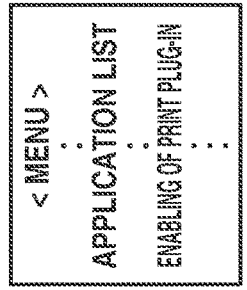
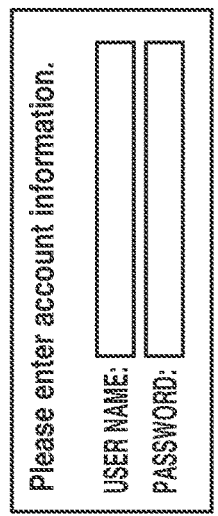
FIG.13D
FIG.13E
FIG.13F

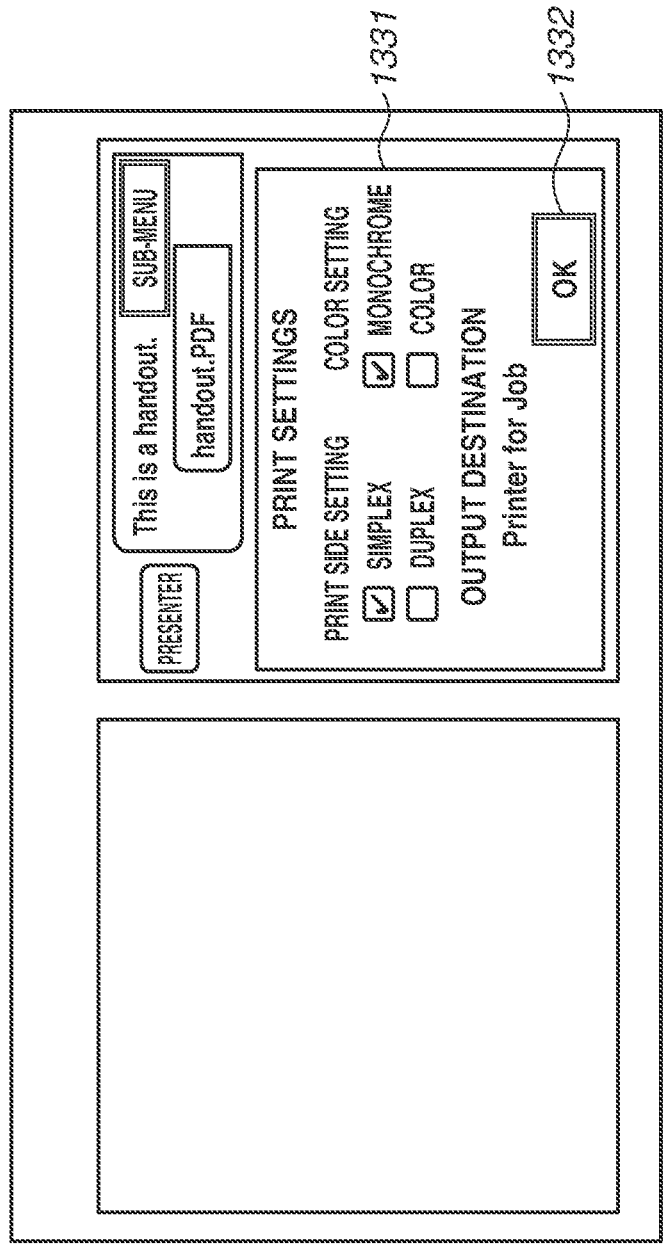

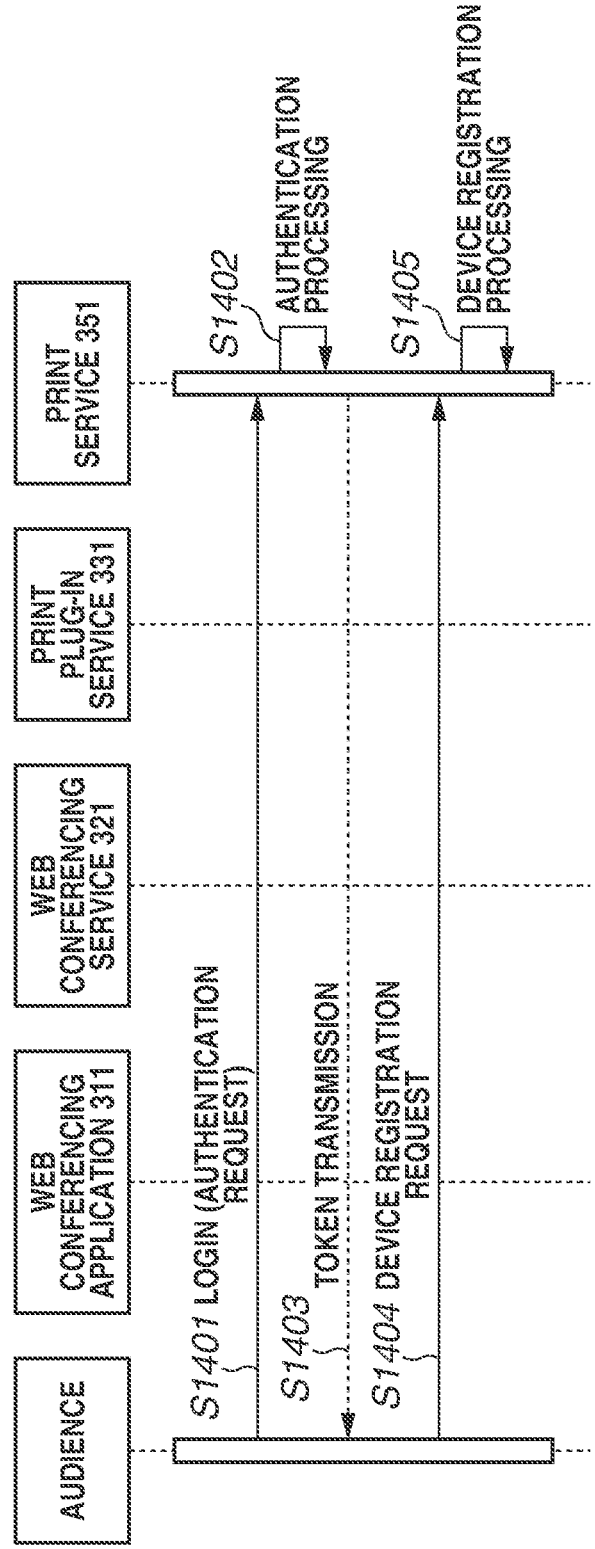

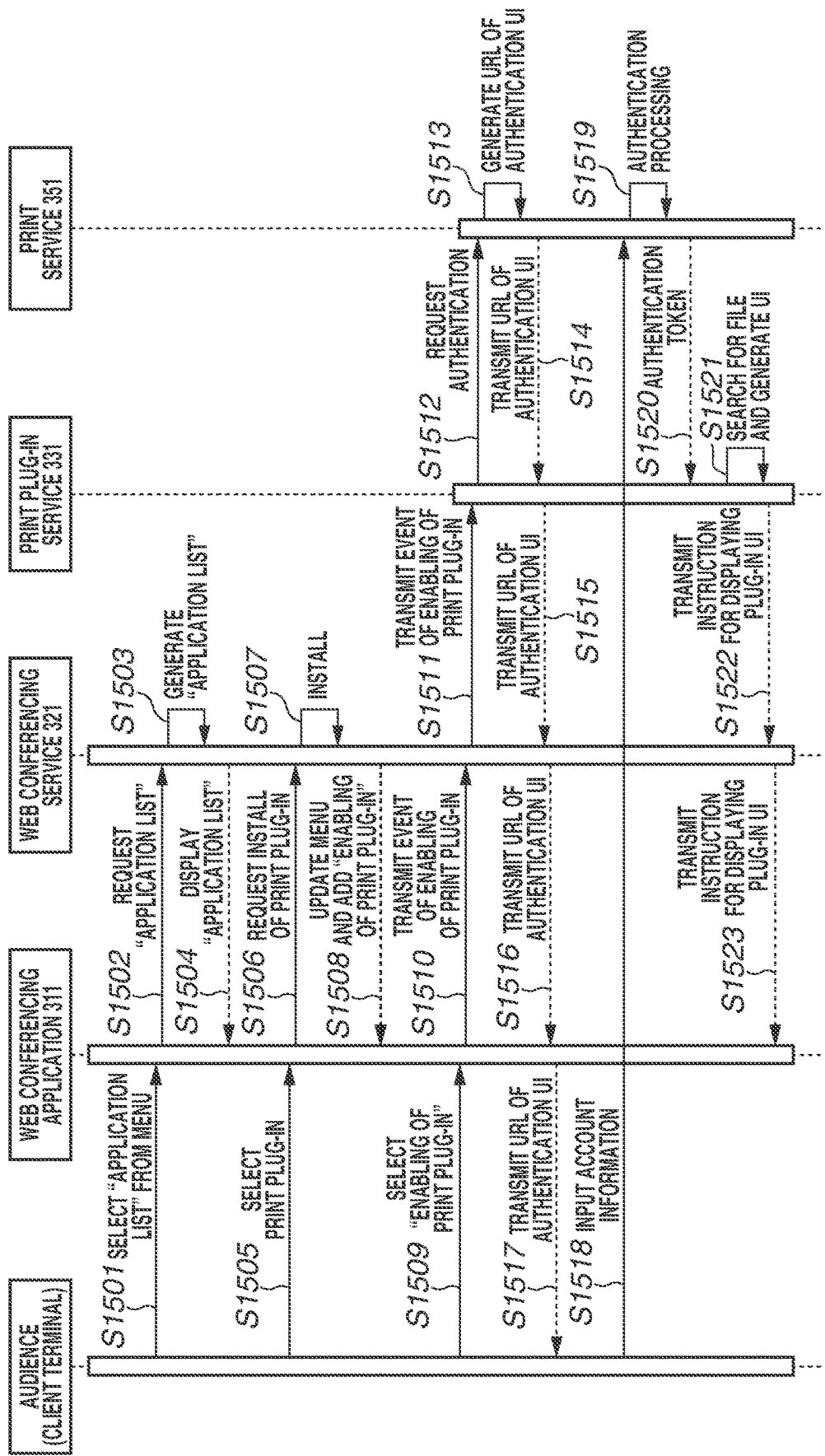

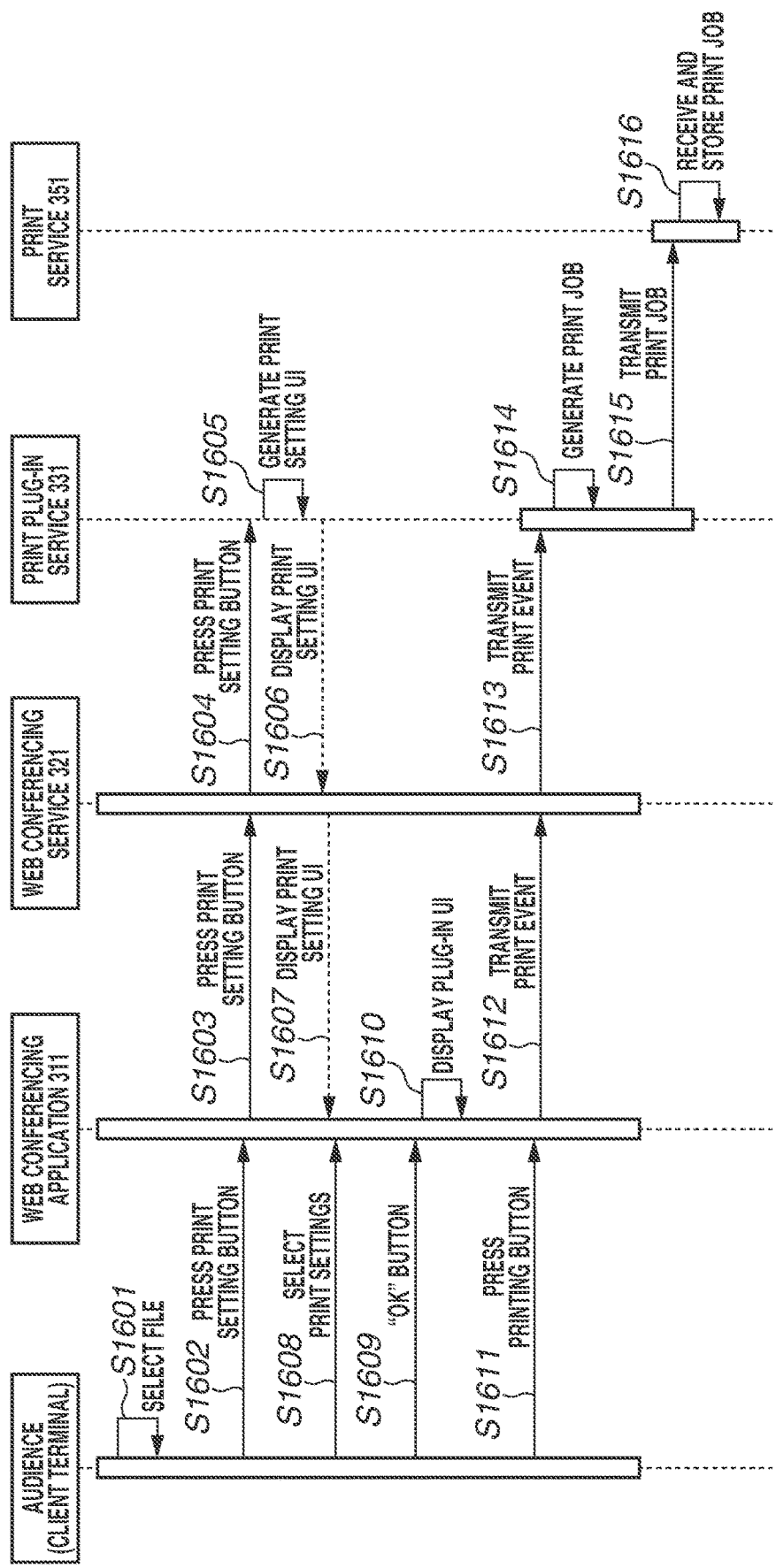

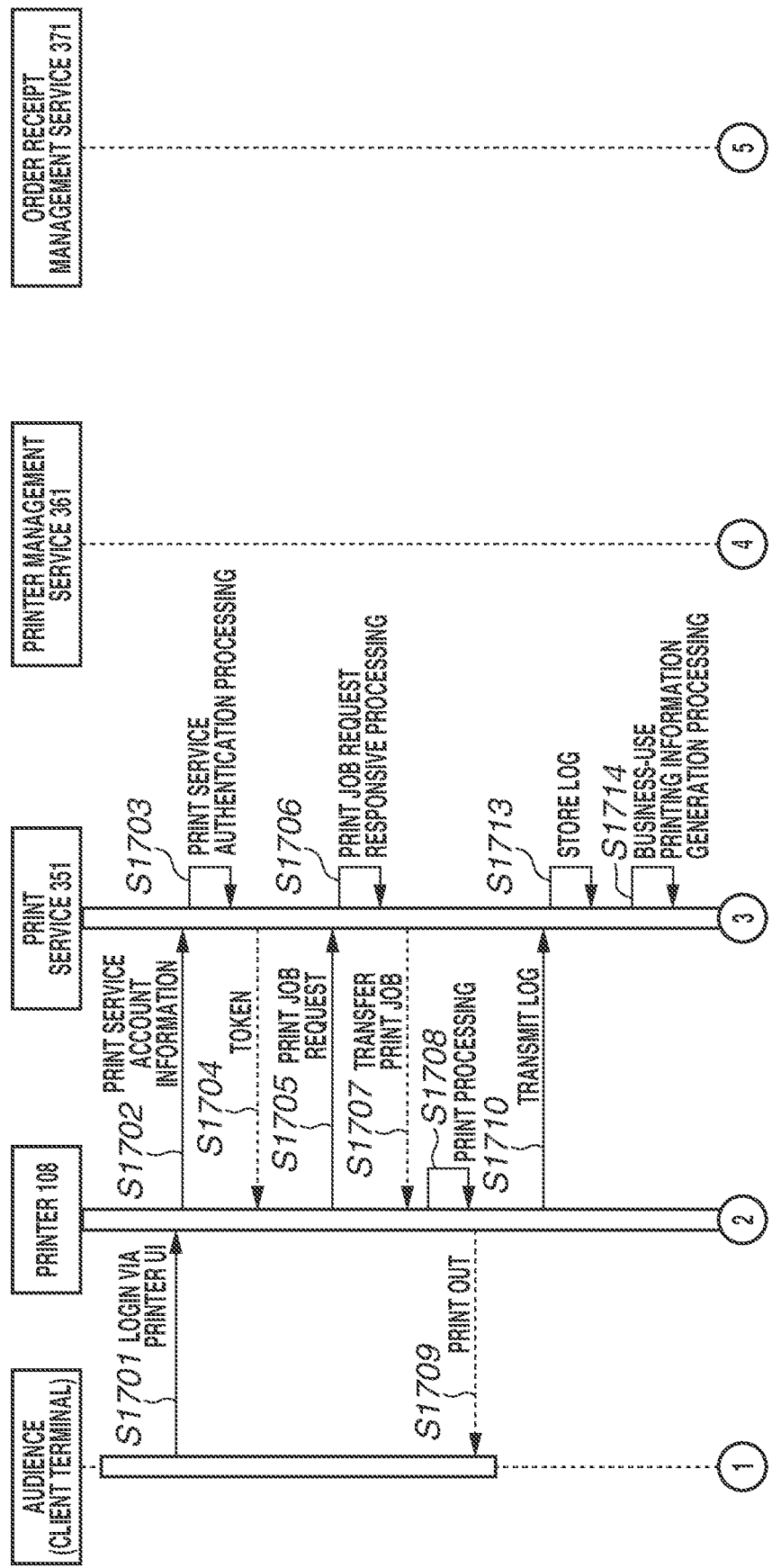

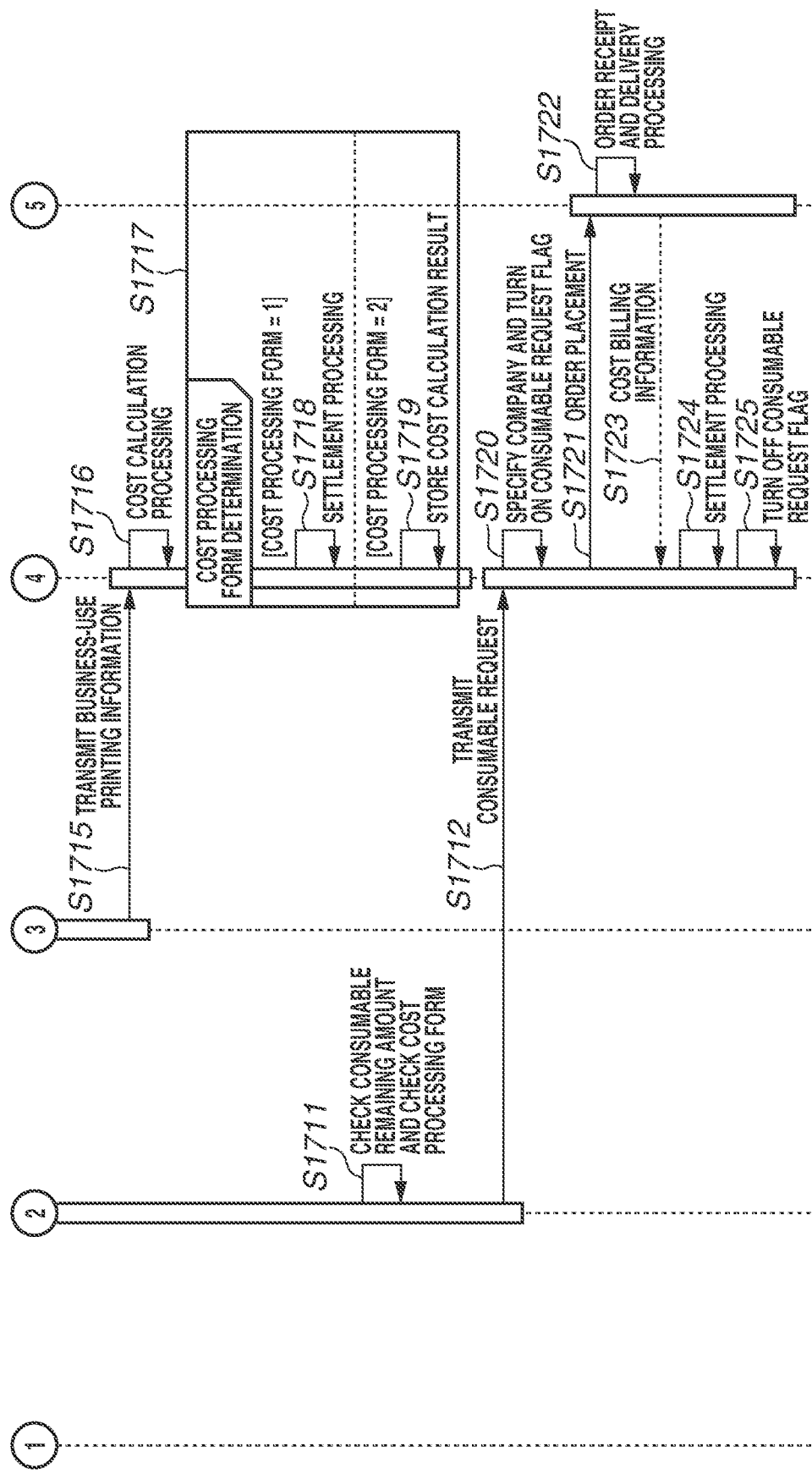

SERVER SYSTEM FOR GENERATING INFORMATION RELATED TO A CONSUMABLE ITEM FOR BUSINESS-USE PRINTING

BACKGROUND OF THE DISCLOSURE

Field of the Disclosure

Aspects of the embodiments generally relate to a server system.

Description of the Related Art

Along with the popularization of cloud services, printing equipment also includes a network communication function, so that there is provided a cloud print service which allows the user to use a terminal to issue a printing instruction via the Internet.

When logging in to a cloud print service on the Internet via any type of terminal, the user is allowed to perform printing using a printer registered with the cloud print service. Moreover, due to social changes, such as work style reform, not only telework (telecommuting) is being remoted but also there are an increasing number of users of, for example, web conferencing. Japanese Patent Application Laid-Open No. 2014-89648 discusses a mechanism for tallying print track records obtained in a case where printing is performed by a printing system which lies outside the control of an in-company system, for example, in a case where a print service in a telework environment is used.

With regard to a printing apparatus located in a company, since printing performed by the printing apparatus is printing for the user to handle the user's business, it is conceivable that the company bears the cost of consumables which are used by the printing apparatus.

However, with regard to a printing apparatus located outside the company, such as a printing apparatus located in a home, the user may sometimes perform printing irrelevant to the business, so that printing performed in the printing apparatus may not necessarily be printing performed for the business. Therefore, with regard to the cost of consumables which are used by such a printing apparatus, it is necessary to manage the cost while distinguishing between printing performed in the course of business and printing irrelevant to business and performed for a user individual and perform calculation of the cost based on information on such management.

SUMMARY OF THE DISCLOSURE

According to an aspect of the embodiments, a server system connectable to a print system including a transmission unit configured to transmit received print data to a printer includes an acquisition unit configured to acquire information indicating an amount of a consumable which is used for printing of transmitted print data to the printer, and a placement unit configured to place an order for the consumable to be used by the printer, based on the acquired information.

Further features of the disclosure will become apparent from the following description of exemplary embodiments with reference to the attached drawings.

BRIEF DESCRIPTION OF THE DRAWINGS

FIGS. 3A, 3B, 3C, 3D, 3E, 3F, 3G, 3H, and 3I are diagrams illustrating examples of system software configurations of the client terminal, the printer, and the respective servers.

FIGS. 4A and 4B are flowcharts illustrating examples of processing operations of a print service according to the first exemplary embodiment.

FIGS. 5A and 5B are flowcharts illustrating examples of processing operations of the print service according to the first exemplary embodiment.

FIGS. 7A and 7B are flowcharts illustrating examples of processing operations of a web conferencing service according to the first exemplary embodiment.

FIGS. 10A, 10B, 10C, 10D, and 10E are flowcharts illustrating examples of processing operations of a printer management service according to the first exemplary embodiment.

FIG. 11 is a flowchart illustrating an example of a processing operation of an order receipt management service according to the first exemplary embodiment.

FIGS. 12A, 12B, 12C, 12D, 12E, 12F, 12G, 12H, 12I, and 12J are diagrams illustrating examples of various pieces of data according to the first exemplary embodiment.

FIGS. 13A, 13B, 13C, 13D, 13E, 13F, and 13G are diagrams illustrating examples of user interfaces (UIs) for a web conferencing application according to the first exemplary embodiment.

FIG. 14 is a diagram illustrating an example of a sequence between respective services according to the first exemplary embodiment.

FIG. 15 is a diagram illustrating an example of a sequence between respective services according to the first exemplary embodiment.

FIG. 16 is a diagram illustrating an example of a sequence between respective services according to the first exemplary embodiment.

FIGS. 17A and 17B are diagrams illustrating an example of a sequence between respective services according to the first exemplary embodiment.

DESCRIPTION OF THE EMBODIMENTS

Figure 1:
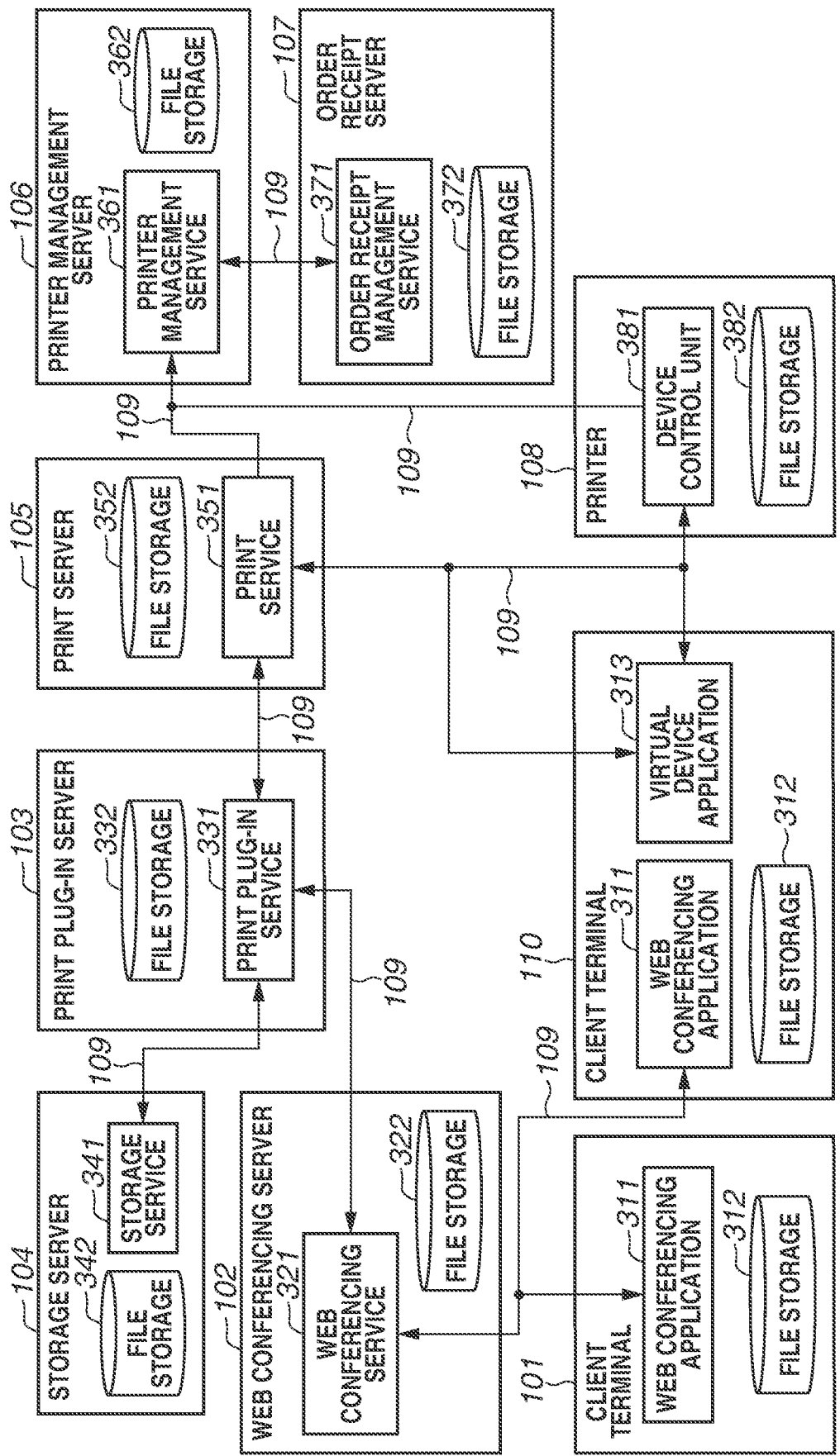
FIG. 1 is a diagram illustrating an example of a system configuration in a first exemplary embodiment.

FIG. 1 is a diagram illustrating a configuration of a print charging system in cloud print in a first exemplary embodiment. A client terminal 101, a web conferencing server 102, a print plug-in server 103, a storage server 104, a print server 105, a printer management server 106, an order receipt server 107, and a printer 108 are interconnected via a network 109.

While, in FIG. 1, one client terminal 101 and one printer 108 are illustrated, there can be a plurality of client terminals 101 and a plurality of printers 108.

Each server is configured with one or a plurality of information processing apparatuses. Moreover, a physically single information processing apparatus can be internally divided into a plurality of virtual servers and such virtual servers can be configured to perform processing operations corresponding to the respective servers. Moreover, each server can be a cloud server, which is located on the cloud.

The network 109 can be, besides a wide area network (WAN) such as the Internet, a closed environment such as an in-company local area network (LAN).

The client terminal 101 is an information processing apparatus, such as a personal computer (PC), a tablet, or a smartphone, and is a terminal which is directly operated by the user. Optional application software is configured to be executable on the client terminal 101.

The printer 108 is a device which actually performs printing on a sheet of paper, and converts print data received via the network 109 into image data and prints the image data.

The print server 105 has the role of receiving a printing instruction and document data from an external device, converting the document data into print data, then transmitting the print data to a predetermined printer 108, and instructing the printer 108 to perform printing. The print server 105 operates as a print server system to which the printer management server 106 is connectable.

Moreover, the print server 105 transmits, to the printer management server 106, information concerning printing performed with use of the printer 108 via the print server 105.

In a case where the print server 105 is located in a cloud environment, the print server 105 may be called a cloud print server.

The web conferencing server 102 allows a plurality of client terminals 101 to be connected thereto via the network 109 and provides functions and user interfaces (UIs) of, for example, screen sharing, voice communication, and online chat.

The printer management server 106 is a server system which manages information about printers currently registered. The printer management server 106 manages user information and information about devices in units of companies and organizations serving as tenants, and manages cost processing and order placement processing with respect to consumables for the devices.

The order receipt server 107 receives an order placement request for consumables from the printer management server 106, and performs order placement and delivery of consumables which are to be used in the printer 108.

The print plug-in server 103 provides, to another service such as a web conferencing service via the network 109, functions for printing, such as file selection, UI generation, and print job generation.

The storage server 104 provides a function of storing and sharing file data via the network 109.

Next, a hardware configuration in the system according to the first exemplary embodiment is described with reference to FIGS. 2A, 2B, 2C, 2D, 2E, 2F, 2G, and 2H. Furthermore, while, in FIGS. 2A to 2H, a central processing unit (CPU) and a memory are each illustrated as a single piece of hardware, the CPU and the memory can be configured as a plurality of CPUs and a plurality of memories.

Figure 2A:
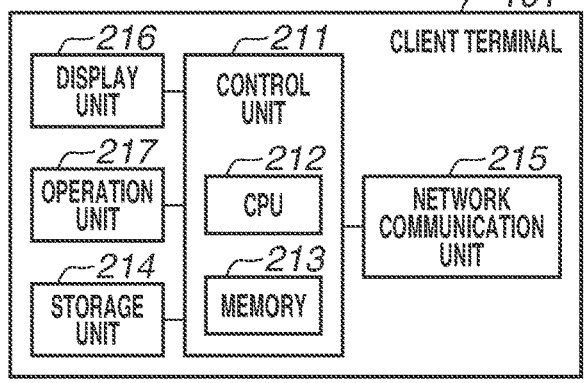
FIGS. 2A, 2B, 2C, 2D, 2E, 2F, 2G, and 2H are diagrams illustrating examples of system hardware configurations of a client terminal, a printer, and respective servers.

FIG. 2A is a block diagram illustrating a hardware configuration of the client terminal 101. The client terminal 101 includes a display unit 216, an operation unit 217, a storage unit 214, a control unit 211, and a network communication unit 215.

The storage unit 214 represents a non-volatile storage device such as a hard disk or solid state drive (SSD), and is capable of storing and rewriting digital data.

The control unit 211 includes a CPU 212 and a memory 213, and controls the entire operation of the client terminal 101.

The CPU 212 loads a program stored in the storage unit 214 onto the memory 213 and executes the program.

The memory 213 is a main storage memory for the CPU 212, and is used as a work area and a temporary storage region onto which to load various programs.

The network communication unit 215 is a device which performs communication with the external network 109, and performs inputting and outputting of digital data with respect to, for example, an external server and a client terminal via the network 109.

The display unit 216 is a device, such as a liquid crystal display, for displaying visual information to the user in real time.

The operation unit 217 is a device for receiving inputting from the user via, for example, a keyboard and a mouse.

For example, a touch panel, which includes the functions of both the display unit 216 and the operation unit 217, may be used.

Figure 2E:
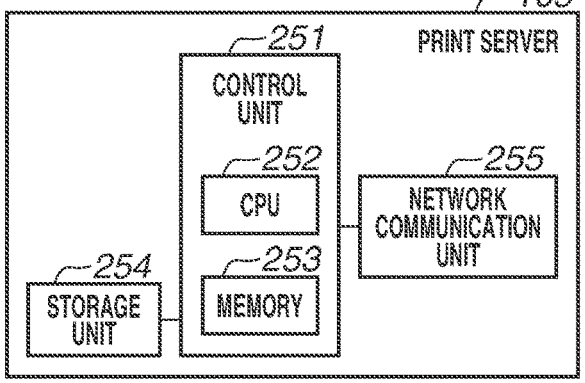
Figure 2B:
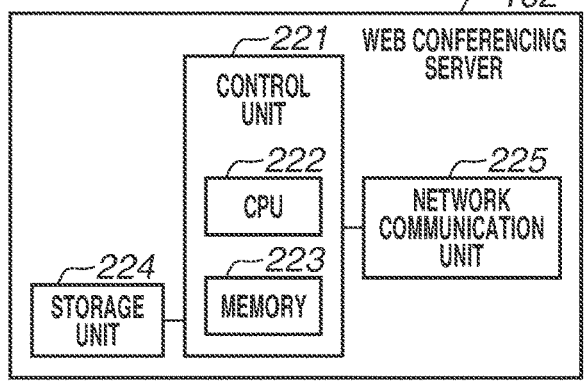

FIG. 2B is a block diagram illustrating a hardware configuration of the web conferencing server 102. The web conferencing server 102 includes a storage unit 224, a control unit 221, and a network communication unit 225. Descriptions of the storage unit 224, the control unit 221, and the network communication unit 225 are equivalent to those in the client terminal 101, and are, therefore, omitted.

Figure 2F:
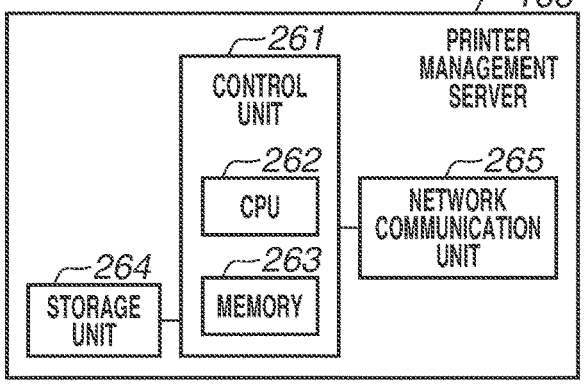
Figure 2C:
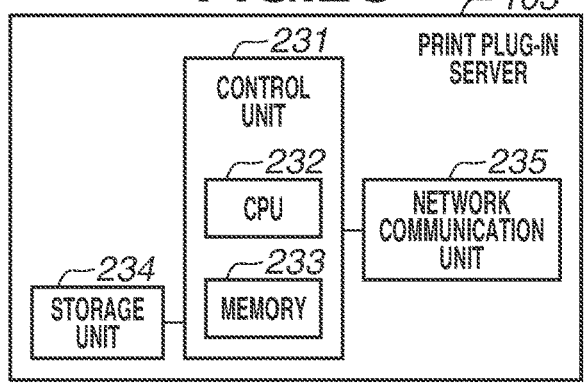

FIG. 2C is a block diagram illustrating a hardware configuration of the print plug-in server 103. The print plug-in server 103 includes a storage unit 234, a control unit 231, and a network communication unit 235. Descriptions of the storage unit 234, the control unit 231, and the network communication unit 235 are equivalent to those in the client terminal 101, and are, therefore, omitted.

Figure 2G:
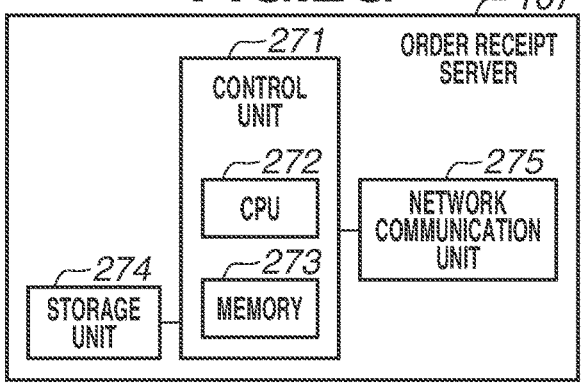
Figure 2D:
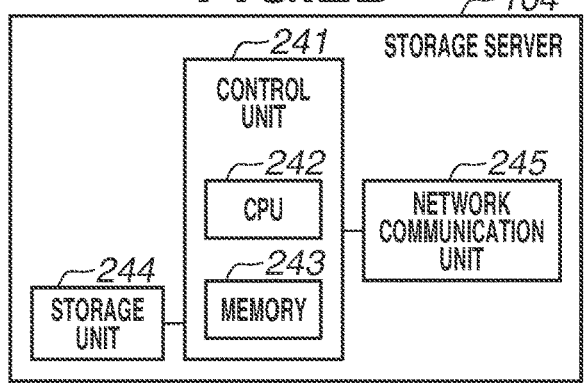

FIG. 2D is a block diagram illustrating a hardware configuration of the storage server 104. The storage server 104 includes a storage unit 244, a control unit 241, and a network communication unit 245.

Descriptions of the storage unit 244, the control unit 241, and the network communication unit 245 are equivalent to those in the client terminal 101, and are, therefore, omitted.

FIG. 2E is a block diagram illustrating a hardware configuration of the print server 105. The print server 105 includes a storage unit 254, a control unit 251, and a network communication unit 255. Descriptions of the storage unit 254, the control unit 251, and the network communication unit 255 are equivalent to those in the client terminal 101, and are, therefore, omitted.

FIG. 2F is a block diagram illustrating a hardware configuration of the printer management server 106. The printer management server 106 includes a storage unit 264, a control unit 261, and a network communication unit 265. Descriptions of the storage unit 264, the control unit 261, and the network communication unit 265 are equivalent to those in the client terminal 101, and are, therefore, omitted.

FIG. 2G is a block diagram illustrating a hardware configuration of the order receipt server 107. The order receipt server 107 includes a storage unit 274, a control unit 271, and a network communication unit 275. Descriptions of the storage unit 274, the control unit 271, and the network communication unit 275 are equivalent to those in the client terminal 101, and are, therefore, omitted.

Figure 2H:
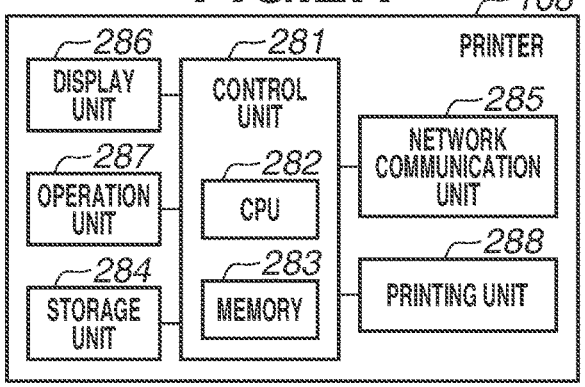

FIG. 2H is a block diagram illustrating a hardware configuration of the printer 108. The printer 108 includes a display unit 286, an operation unit 287, a storage unit 284, a control unit 281, a network communication unit 285, and a printing unit 288.

The display unit 286 is a device for displaying information to the user in real time, such as a touch panel and a light-emitting diode (LED) provided in the printer 108.

The operation unit 287 is a device for receiving inputting from the user, and may include, in addition to a touch panel, hardware keys such as a numeric keyboard. The storage unit 284 and the control unit 281 are equivalent to those in the client terminal 101, and are, therefore, omitted from description.

The network communication unit 285 is a device which performs communication with the external network 109, and has mainly the role of receiving print data and transmitting information indicating the status of the printer 108, such as the occurrence of an error, to, for example, an external server.

The printing unit 288 is a device which performs print processing by performing a series of operations, including sheet feed, printing, and sheet discharge, with respect to a sheet of paper prepared in a cassette or a tray. The method of printing can be an electrophotographic method or an inkjet method, and is not specifically limited. A finishing device for use in discharging sheets, such as that for a duplex printing unit, a stapling unit, or a punching unit, is also included in the printing unit 288. Furthermore, while in the first exemplary embodiment, a single-function printer, which effects a printing function, is used as an example of the printer 108, a multifunction printer (multifunction peripheral), which further includes a scanner function and a facsimile (FAX) function, can be used.

Next, a software configuration of the system in the first exemplary embodiment is described with reference to FIGS. 3A, 3B, 3C, 3D, 3E, 3F, 3G, 3H, and 3I.

FIG. 3A is a diagram illustrating an example of software blocks of the client terminal 101. Each software block is implemented by the CPU 212 and the memory 213 operating.

A web conferencing application 311 is an application installed on the client terminal 101, and includes a web conferencing service interface (I/F) unit 31101 and a UI display unit 31102.

The web conferencing service I/F unit 31101 is a software module which performs communication of data or commands with a web conferencing service 321.

The UI display unit 31102 displays a UI prepared by the web conferencing service 321 on the display unit 216 of the client terminal 101 or receives a user operation. Displaying of a UI in web conferencing can be displayed via a web browser.

FIG. 3B is a diagram illustrating an example of a software module of the web conferencing service 321, which operates in the web conferencing server 102.

An account management unit 32101 manages authentications of users currently registered with the web conferencing service 321. The account management unit 32101 receives, from the user, an identifier (ID) and a password for logging in to the web conferencing service 321 and performs authentication of the user based on the acquired ID and password.

A voice communication unit 32102 provides a function in which web conferencing participants talk with each other via voice communication using the web conferencing service 321. Voice data input from the web conferencing application 311 of a web conferencing participant is transmitted via the web conferencing service 321 to the web conferencing application 311 of another web conferencing participant participating in the same conference.

A screen sharing unit 32103 provides a function in which web conferencing participants share a screen via the web conferencing service 321. Screen data an instruction for sharing which is issued by the web conferencing application 311 of a web conferencing participant is transmitted to the web conferencing application 311 of another web conferencing participant via the web conferencing service 321, and is then displayed on a web conferencing UI by the UI display unit 31102. Furthermore, in the web conferencing service 321, an operation which a user performs in the state of displaying a file is shared by another user. Therefore, a user participating in a web conference is allowed to view an operation which another user performs via a screen for the web conference.

A chat unit 32104 provides a function in which web conferencing participants have a conversation in text with each other via the web conferencing service 321. Text data input from the web conferencing application 311 of a web conferencing participant is transmitted to the web conferencing application 311 of another web conferencing participant via the web conferencing service 321, and is then displayed on a web conferencing UI by the UI display unit 31102.

A web conferencing application I/F unit 32105 processes exchange of data and commands with the web conferencing application 311.

A UI display unit 32107 has the role of, for example, displaying, in addition to a UI originally prepared by the web conferencing service 321, a UI which is prepared by the print plug-in service 331 to be added to the web conferencing service 321 and receiving an operation performed by the user on such an added UI.

The added UI can be displayed via a web browser as with the web conferencing UI.

A print plug-in service I/F unit 32106 processes exchange of data and commands with the print plug-in service 331.

An example of the web conferencing UI is described below with reference to FIGS. 13A, 13B, 13C, 13D, 13E, 13F, and 13G.

FIG. 3C is a block diagram illustrating a software configuration of the print plug-in service 331.

A file list generation unit 33101 has the role of, for example, generating a list of files targeted for printing and copying the target files to the print plug-in service 331.

An additional UI generation unit 33102 is software for adding a UI for printing to UIs which the web conferencing service 321 generates. The generated additional UI is transmitted to the web conferencing service 321 and is then displayed on the web conferencing UI by the UI display unit 32107.

A print job generation unit 33103 generates a print job described in a page description language (PDL), based on a file targeted for printing and predetermined print settings and then transmits the print job to a print service 351.

A print plug-in I/F unit 33104 processes exchange of data and commands with the web conferencing service 321.

FIG. 3D is a block diagram illustrating a software configuration of a storage service 341.

An account management unit 34101 manages authentications of users currently registered with the storage service 341 and permission or non-permission of access to a stored file. Moreover, the storage service 341 stores real files.

FIG. 3F is a block diagram illustrating an example of a software configuration of a device control unit 381, which operates in the printer 108.

A print data reception unit 38101 receives print data transmitted from an external device via the network 109, and stores the received print data in the storage unit 284 of the printer 108.

A print output unit 38102 performs printing on a sheet of paper.

A consumable management unit 38103 manages the remaining amount of paper and the remaining amount of ink or toner in the printer 108.

A consumable request transmission unit 38104 transmits a consumable request to a printer management service 361 when the remaining amount of paper or the remaining amount of ink or toner in the printer 108 is less than or equal to a predetermined value. Furthermore, in the description of the first exemplary embodiment, a toner cartridge is taken as an example of a consumable. The consumable for use in the printer 108 can be, for example, a toner cartridge, an ink cartridge, or a photosensitive drum, and thus can be other than a toner cartridge, as long as being a component attached to the printer 108 in a replaceable manner.

A printer management service I/F unit 38105 processes exchange of data with the printer management service 361.

A print service I/F unit 38106 processes exchange of data with the print service 351.

FIG. 3G is a block diagram illustrating a software configuration of the print service 351.

An account management unit 35101 manages authentications of tenants and users currently registered with the print service 351.

The user is allowed to distinguish printing operations for respective purposes of use even in the physically same device by logging in to the print service 351 with different accounts for respective purposes of use and registering a device. For example, in a case where a user X possesses a printer A and belongs to a company A and a company B, the user X registers information about the printer A with respect to each of an account for the company A and an account for the company B. When printing a handout for the company A, the user X operates the client terminal 101 to log in to the print service 351 with the account for the company A and issue a printing instruction. Then, the user X accesses the print service 351 via the printer A and causes the printer A to perform printing. This enables realizing that this printing is printing the cost of which is to be settled by the company A.

On the other hand, in a case where the user X prints a handout for the company B, the user X operates the client terminal 101 to log in to the print service 351 with the account for the company B and issue a printing instruction. Then, the user X accesses the print service 351 via the printer A and causes the printer A to perform printing. This enables realizing that this printing is printing the cost of which is to be settled by the company B.

Additionally, when intending to perform private printing, the user X causes the client terminal 101 to connect to the printer A without via the print service 351 and issue a printing instruction. This enables distinguishing between printing the cost of which is to be settled by the company A, printing the cost of which is to be settled by the company B, and private printing. While, in the above description, private printing is performed without via the print service 351, a configuration in which an account for private use different from those for the company A and the company B is registered with the print service 351 and, in private printing, the account for private use is used can be employed.

FIG. 12A is a diagram illustrating an example of account information which the print service 351 manages. A user ID is identification information for identifying a logged-in user. A tenant ID is identification information for identifying a tenant to which the logged-in user belongs. A device ID is identification information about a printer which the logged-in user is allowed to use for printing. A print queue ID is identification information about a print queue in which print data with respect to which the logged-in user has issued a printing instruction is queued. A plurality of device IDs is able to be associated with the print queue ID. Associating a plurality of device IDs with the print queue ID enables printing print data queued in the print queue ID to be printed by any of printers having the associated device IDs.

FIG. 12H is a diagram illustrating an example of tenant information which the print service 351 manages. A tenant ID is identification information for identifying an organization included in a company. The tenant ID is used for, for example, billing of a cost of printing. A Company name is the name of a company to which an organization having the tenant ID belongs. A device ID list is a list including information for identifying a printer associated with the applicable tenant. A user ID list is a list of pieces of identification information of users belonging to the applicable tenant.

A device management unit 35102 illustrated in FIG. 3G manages information concerning printers currently registered with the print service 351. FIG. 12F is a diagram illustrating an example of device information stored in the print service 351. A device ID is identification information for specifying the printer 108. A tenant ID is identification information about a tenant to which the applicable printer belongs. A user ID is identification information about a user who is allowed to use the applicable printer.

A print management unit 35103 illustrated in FIG. 3G performs, for example, determination as to whether to permit a print job delivery and receipt request transmitted from the printer 108 and management of delivery and receipt of a print job. Moreover, the print management unit 35103 transmits a cost processing request to the printer management service 361. The print management unit 35103 stores the correspondence between a company name and the printer management server 106, and specifies a printer management server 106 serving as a transmission destination of printing information with use of a company name specified based on tenant information about a tenant in which printing has been performed. Then, the print management unit 35103 transmits a cost processing request and business-use printing information to the specified printer management server 106.

FIG. 12B is a diagram illustrating an example of business-use printing information which is communicated to the printer management server 106. A business-use printing information ID is information for identifying the applicable printing. A tenant ID is information about a tenant to which a user who has performed the applicable printing belongs. A device ID is information for identifying a printer in which the applicable printing has been performed. A number of consumed sheets of paper is the number of sheets of paper which have been used in the applicable printing. An ink/toner consumed amount is information indicating the amount of recording agent, such as ink or toner, which has been used in the applicable printing. A user ID is identification information about a user who has performed the printing.

A print security management unit 35104 illustrated in FIG. 3G manages, for example, retention of log information about delivery and receipt of a print job and prevention or reduction of detention for a predetermined time or more of a print job in a print queue 10402.

FIG. 12C is a diagram illustrating an example of log information. A device ID is information for identifying a device which has been used in the printing. A tenant ID is information for identifying a tenant to which a user who has issued an instruction for the applicable printing belongs. A user ID is identification information about a user who has issued an instruction for the printing. A job pullout date and time is information indicating the date and time at which a request for acquisition of print data has been received from the printer 108. A print data name is information indicating a file name of print data. A print number of pages indicates the number of pages of print data. A thumbnail is a thumbnail image which is a reduced image of a particular page of print data.

A print queue management unit 35105 receives a print job from an external device, and stores the received print job in a region prepared in the storage unit 254 of the print server 105.

FIG. 3H is a block diagram illustrating a software configuration of the printer management service 361, which operates in the printer management server 106.

A consumable management unit 36101 manages, for example, reception of a request for cost processing from an external device, calculation of a cost, settlement processing corresponding to a cost processing form, and order placement processing.

A cost processing unit 36102 performs, for example, determination of a cost processing form and charging of a final cost to a company to which the user belongs. When receiving a cost request from the consumable management unit 36101, the cost processing unit 36102 performs cost charging processing from the user to a company to which the user belongs. When receiving a delivery cost request from an order receipt management service 371, the cost processing unit 36102 performs cost charging from a delivery agent to a company to which the user belongs.

An order placement processing unit 36103 specifies a consumable, and transmits order placement information to the order receipt management service 371. Moreover, the order placement processing unit 36103 also receives cost charging information transmitted from the order receipt management service 371 as a response.

FIG. 12D is a diagram illustrating an example of order placement information. A device ID is information for identifying a printer 108 which uses a consumable for which an order is placed. A tenant ID is identification information about a tenant to which a printer which uses the consumable belongs. A delivery location address is the address of a delivery location of the consumable. A delivery consumable is information for specifying a consumable to be delivered, and is, for example, the model number of a toner cartridge. A delivery consumable amount is information indicating, for example, the number of consumables for which an order is placed.

A tenant management unit 36104 illustrated in FIG. 3H manages users, printers, and tenants currently registered with the printer management service 361. FIG. 12G is a diagram illustrating device information which is registered with the printer management service 361. A user ID is information for identifying the user. The user ID, which is registered with the printer management service 361, is information indicating a user who becomes a payment recipient to which a company pays the cost of a consumable. A tenant ID is information indicating a tenant to which the applicable user belongs, and is used as, for example, the billing destination of the cost. A device ID is identification information about a printer which the applicable user uses for printing. Furthermore, a printer ID is used to specify the type of a consumable for which to place an order or to calculate the cost for purchasing a consumable. A cost processing form is expressed by a numeral "1" or "2". The cost processing form "1" is a form in which the user temporarily pays the price of a consumable for another and, then, a company pays, to the user, a portion corresponding to the business out of the cost of the consumable. The cost processing form "2" is a form in which, instead of the user, the printer management service 361 places an order for a consumable and then performs settlement of the cost thereof with respect to a company to which the user belongs. A delivery location address is an address serving as a delivery location of the consumable, and is often the address of a place in which a printer specified by the device ID is located. An ink/toner type is information indicating the type of an ink cartridge or toner cartridge which is used in the device having the applicable device ID. A paper type is information indicating the type of paper which is used by the applicable printer.

FIG. 12H is a diagram illustrating an example of tenant information which a tenant management unit 36104 manages. Furthermore, the tenant information which the tenant management unit 36104 manages can be the same as or different from the tenant information which the print server 105 manages.

FIG. 3I is a block diagram illustrating a software configuration of the order receipt management service 371, which operates in the order receipt server 107.

An order receipt management unit 37101 manages a consumable purchase request received from an external device.

A delivery management unit 37102 manages delivery of the purchased consumable to the user.

A delivery cost billing unit 37103 manages billing of a consumable cost or delivery cost, and transmits delivery cost billing information to the printer management service 361.

FIG. 12E is a diagram illustrating an example of delivery cost billing information which is transmitted from the order receipt server 107 to the printer management service 361. The delivery cost billing information includes, for example, a device ID, a tenant ID, a user ID of the user who uses the present system, a delivery location address, a consumable to be delivered, the amount of a consumable to be delivered, the cost of a consumable to be delivered, a shipping cost, and a total cost.

As an initial matter, processing for registering a printer with the print service 351 is described with reference to FIG. 14. The present sequence is an operation to perform printing via the print server 105. The audience being a user of the printer preliminary registers information about a printer which is to be used for the print service 351. Furthermore, details of this processing for the print service 351 are described below with reference to FIGS. 4A and 4B.

First, in step S1401, the audience operates the client terminal 101 to transmit a login request to the print service 351. Thus, the user transmits, to the print service 351, a user ID and a password for logging in to the print service 351.

In step S1402, the print service 351 performs authentication processing with use of the user ID and password received from the client terminal 101. If authentication is successful, then in step S1403, the print service 351 transmits, as a response, an access token to the client terminal 101. The access token is used for the client terminal 101 to access the print service 351.

In step S1404, the audience operates the client terminal 101 to transmit a registration request for the printer 108 to the print service 351. The client terminal 101 registers information for the print service 351 to transmit print data to the printer 108, such as a device ID or an Internet Protocol (IP) address.

In step S1405, the print service 351 performs device registration processing with use of the received information. With the device registration processing performed, the device information described with reference to FIG. 12F is registered with the print service 351.

Furthermore, here, a case where the client terminal 101 transmits a device registration request to the print service 351 has been described as an example. A configuration in which the user operates the printer 108 to cause the printer 108 to transmit a device registration request to the print service 351 can be employed.

Next, a preparation for a file which is to be printed via the web conferencing service 321 is described.

First, the presenter logs in to the web conferencing service 321 to issue an instruction to start a conference. Then, the web conferencing service 321 issues a conference ID and displays a conference screen such as that illustrated in FIG. 13A. The conference screen includes, as an example, a user interface 1301, which the web conferencing service 321 provides. A region 1302 is a region in which a screen shared by a plurality of users is displayed. The screen shared by a plurality of users is, for example, a screen in which an image captured by a camera of the client terminal of each user is displayed, a screen which is currently displayed on a monitor of the client terminal, or a screen in which a file shared on the web conferencing service 321 is displayed. A user who participates in the web conference is allowed to view an operation which another user performs on a screen displayed in the region 1302. A region 1303 is a chat region. In the chat region, a text transmitted from each client terminal is displayed. A button 1304 is a menu button used to display services which the web conferencing service 321 provides.

The presenter inputs the Uniform Resource Locator (URL) of a handout file placement site as a message 1305 in the region 1303 for the web conference UI. Then, the URL for accessing a handout file is displayed in the region 1305. Here, instead of the URL, a file can be directly placed. In that case, the file is uploaded to a file storage 322 of the web conferencing server 102. When the URL of a file which users participating in the web conference share is posted on the chat, the posted URL is stored in association with a conference ID assigned to the web conference. Even in a case where a file is uploaded, similarly, a path indicating the storage location of the uploaded file and the conference ID are stored in association with each other.

The handout file placement site can be the file storage 322 of the web conferencing server 102, a file storage 342 of the storage server 104, or a file storage 312 of the client terminal 101.

With the above-mentioned operation performed, information about a file to be shared in the web conferencing service 321 is shared by the audience on the web conferencing service 321.

Next, enabling of a print plug-in required for the user being the audience to print a file shared in the web conferencing service 321 is described with reference to FIG. 15.

Furthermore, details of processing which is performed by the print plug-in service 331 at this time are described below with reference to FIGS. 6A and 6B. Moreover, details of processing which is performed by the print service 351 at this time are described below with reference to FIG. 4A. Moreover, details of processing which is performed by the web conferencing service 321 at this time are described below with reference to FIG. 7A.

When the user being the audience accesses the web conferencing service 321, a conference screen such as that illustrated in FIG. 13A is displayed.

Upon receiving selection of the button 1304, the web conferencing application 311, which is installed on the client terminal 101, displays a menu list illustrated in FIG. 13B. In step S1501, the web conferencing application 311 receives selection of "application list" from the menu list. In step S1502, the web conferencing application 311 requests information about the application list from the web conferencing service 321. In step S1503, the web conferencing service 321 generates information about the application list, and, in step S1504, the web conferencing service 321 transmits, to the web conferencing application 311, an instruction for displaying the application list. With this processing, an application list screen illustrated in FIG. 13C is displayed. In the application list screen, as one of applications which are able to be used on the web conferencing service 321, a print plug-in 1311 is displayed. The print plug-in 1311 is an application which assists in printing a handout which is shared in the web conferencing service 321. In step S1505, the web conferencing application 311 receives selection of the print plug-in 1311 from the user. In step S1506, the web conferencing application 311 communicates an install request for the print plug-in 1311 to the web conferencing service 321. In step S1507, the web conferencing service 321 performs processing for installing the print plug-in 1311. With the print plug-in 1311 installed, the web conferencing service 321 becomes able to connect to the print plug-in service 331 during a period in which the user logs in to the web conferencing service 321.

In step S1508, the web conferencing service 321 transmits a communication to the web conferencing application 311 to cause the web conferencing application 311 to update displaying of the menu and add "enabling of print plug-in" to the menu.

When the user has selected the button 1304 again, the web conferencing application 311 displays a menu list illustrated in FIG. 13E. In the menu list illustrated in FIG. 13E, the web conferencing application 311 displays "enabling of print plug-in", which has not been displayed in the menu list illustrated in FIG. 13B.

In step S1509, the web conferencing application 311 receives selection of "enabling of print plug-in". In step S1510, the web conferencing application 311 communicates "enabling of print plug-in" to the web conferencing service 321. In step S1511, the web conferencing service 321 transmits a notification of enabling of print plug-in to the print plug-in service 331.

In step S1512, the print plug-in service 331 transmits an authentication request to the print service 351. In step S1513, upon receiving the authentication request from the print plug-in service 331, the print service 351 generates a URL used for displaying a screen for receiving inputting of authentication information (an authentication UI).

In step S1514, the print service 351 communicates the URL of the authentication UI to the print plug-in service 331.

In step S1515, the print plug-in service 331 communicates the URL used for displaying the authentication UI, generated by the print service 351, to the web conferencing service 321. In step S1516, the web conferencing service 321 communicates the received URL to the web conferencing application 311. In step S1517, the web conferencing application 311 communicates the received URL to the client terminal 101. The client terminal 101, which the audience operates, refers to the URL communicated from the web conferencing application 311, and displays an authentication UI illustrated in FIG. 13F. The user inputs, to the authentication UI, a user name and a password for logging in to the print service 351, and then selects an OK button (not illustrated). In step S1518, the client terminal 101 transmits account information to the print service 351, and requests the print service 351 to perform authentication processing. In step S1519, the print service 351 performs authentication processing, and, in step S1520, the print service 351 issues an authentication token for the print plug-in service 331 to access the print service 351.

In step S1521, the print plug-in service 331 acquires information about files currently registered in the chat of the conference in which the user participates, and causes the web conferencing service 321 to display a screen used for selecting a file to be printed. For example, in step S1521, the print plug-in service 331 requests, from the web conferencing service 321, information about files associated with the conference ID of the web conference in which the user participates. Then, the print plug-in service 331 generates a screen used for selecting a file to be printed, based on the information about files associated with the conference ID acquired from the web conferencing service 321.

In step S1522, the print plug-in service 331 transmits, to the web conferencing service 321, an instruction for displaying the generated screen. In step S1523, the web conferencing service 321 transmits, to the web conferencing application 311, an instruction for displaying the screen generated by the print plug-in service 331. The web conferencing application 311 displays a UI for displaying an uploaded file, according to the content communicated from the web conferencing service 321.

FIG. 13D is a diagram illustrating a print file selection scree generated by the print plug-in service 331. A region 1322 is a region in which the UI generated by the print plug-in service 331 is displayed. In the region 1322, a list of document files posted on the chat is displayed, thus enabling the user to select a file to be printed. A button 1323 is a button used to perform print settings, and a button 1324 is a button used to issue an instruction for printing.

Next, a sequence performed from when the user issues a printing instruction to when the print service 351 receives a print job is described with reference to FIG. 16. Furthermore, details of processing which is performed by the print plug-in service 331 at this time are described below with reference to FIG. 6B. Moreover, details of processing which is performed by the print service 351 at this time are described below with reference to FIG. 5A. Moreover, details of processing which is performed by the web conferencing service 321 at this time are described below with reference to FIG. 7B.

First, in step S1601, the audience selects a file targeted for printing from the list of files displayed in the region 1322 illustrated in FIG. 13D.

In step S1602, the audience presses the "setting" button 1323. In step S1603, the web conferencing application 311 communicates pressing of the print setting button to the web conferencing service 321. In step S1604, the web conferencing service 321 communicates information indicating that the "setting" button 1323 has been selected to the print plug-in service 331. In step S1605, the print plug-in service 331 generates a print setting screen.

In step S1606, the print plug-in service 331 communicates an instruction for displaying the print setting screen to the web conferencing service 321. In step S1607, the web conferencing service 321 communicates an instruction for displaying the print setting screen to the web conferencing application 311. With this processing performed, a screen illustrated in FIG. 13G is displayed on the client terminal 101. A region 1331 is a region used for performing print settings. The user performs settings in the region 1331, and then selects an "OK" button 1332. In step S1608, the web conferencing application 311 receives the print settings from the user.

In step S1609, the web conferencing application 311 receives a notification indicating that the "OK" button has been selected. In step S1610, the web conferencing application 311 displays the screen illustrated in FIG. 13D again. At this time, the web conferencing application 311 can perform displaying using cache information about the screen or can access the print plug-in service 331 again, acquire data about the screen from the print plug-in service 331, and perform displaying using the acquired data.

In step S1611, the user presses the button 1324 to issue an instruction for printing. In step S1612, the web conferencing application 311 receives selection of the button 1324 and communicates a print event to the web conferencing service 321. In step S1613, the web conferencing service 321 communicates the print event to the print plug-in service 331. In step S1614, the print plug-in service 331 acquires a file to be printed from the web conferencing service 321 or the storage service 341, and generates a print job in which the print settings set in the print setting screen has been reflected. In step S1615, the print plug-in service 331 transmits the print job to the print service 351. Specifically, in step S1615, the print plug-in service 331 accesses the print service 351 with use of an authentication token acquired in the processing illustrated in FIG. 15. In step S1616, the print service 351 receives the print job from the print plug-in service 331, and stores the received print job in a file storage 352 of the print server 105.

Next, a sequence performed from when the user logs in to the printer 108 via a printer UI to when settlement of a consumable is performed is described with reference to FIGS. 17A and 17B. Furthermore, details of processing which is performed by the print service 351 at this time are described below with reference to FIG. 4A and FIG. 5B. Moreover, details of processing which is performed by the printer 108 at this time are described below with reference to FIG. 8A. Moreover, details of processing which is performed by the printer management service 361 at this time are described below with reference to FIGS. 10A, 10B, 10C, 10D, and 10E. Moreover, details of processing which is performed by the order receipt management service 371 at this time are described below with reference to FIG. 11.

First, in step S1701, the audience logs in to the print service 351 via the printer UI in the printer 108. In step S1702, the printer 108 transmits, to the print service 351, an authentication request together with a user name and a password for the print service 351 input by the user.

In step S1703, the print service 351 performs authentication processing with use of information about the user name and password received from the printer 108. If user authentication is successful, then in step S1704, the print service 351 transmits a token to the printer 108. The token is used for the printer 108 to access the print service 351.

Next, in step S1705, the printer 108 accesses the print service 351 with use of the token received from the print service 351, and request a print job from the print service 351. In step S1706, the print service 351 performs processing responding to the received print job request. The processing responding to the print job request is processing for, for example, specifying a print job corresponding to the user who is logging in to the print service 351 via the printer 108.

In step S1707, the print service 351 transmits the specified print job to the printer 108. In step S1708, the printer 108 performs processing for printing of the received print job. Then, in step S1709, the printer 108 executes the print job to output an image.

In step S1710, the printer 108 transmits a log of printing to the print service 351. The log of printing is information illustrated in FIG. 12C. In step S1713, the print service 351 integrates the log received from the printer 108 and a log of processing which the print service 351 itself has performed and stores the integrated logs.

In step S1714, the print service 351 performs business-use printing information generation processing. Details of the business-use printing information generation processing are described below. In step S1715, the print service 351 transmits the generated business-use printing information to the printer management service 361.

In step S1716, the printer management service 361 performs cost calculation processing. Details of the cost calculation processing are described below with reference to FIGS. 10A and 10B. Moreover, in step S1717, the printer management service 361 performs processing corresponding to each cost processing form.

Here, the cost processing form being "1" is a form in which the user temporarily pays the cost of a consumable for use in the printer 108 for another and, then, the company pays, to the user, an amount of money corresponding to the consumable used for printing related to the business out of the amount of money paid by the user. In a case where the cost processing form is "1", in step S1718, the printer management service 361 performs settlement processing. The cost processing form being "2" is a form in which, instead of the user, the company places an order for a consumable and delivers the consumable to the location of the user. In a case where the cost processing form is "2", in step S1719, the printer management service 361 stores a cost calculation result.

In step S1711, after transmitting the log, the printer 108 performs consumable remaining-amount check and cost processing form check. In a case where the cost processing form is "2" and the remaining amount of the consumable has become small, in step S1712, the printer 108 transmits a consumable request to the printer management service 361.

Next, in step S1720, upon receiving the consumable request, the printer management service 361 performs processing for, for example, specifying a company and turning on a consumable request flag. Then, in step S1721, the printer management service 361 places an order for the consumable to the order receipt management service 371.

Next, in step S1722, upon receiving the order placement of the consumable, the order receipt management service 371 performs processing related to the order receipt and delivery processing. Then, in step S1723, the order receipt management service 371 transmits cost billing information to the printer management service 361.

Next, in step S1724, upon receiving the cost billing information, the printer management service 361 performs settlement processing. Then, in step S1725, the printer management service 361 turns off the consumable request flag.

Thus far is a serial flow performed from the time of printing of a file shared in the web conferencing service 321 to the time of cost management for a consumable related to the printing. In the following description, details of each processing described above are described.

First, processing in which the print service 351 performs user authentication and processing for registering a printer with the print service 351 are described with reference to FIGS. 4A and 4B.

Processing illustrated in each of FIGS. 4A and 4B is implemented by the CPU 252 loading a program for the print service 351 stored in the storage unit 254 of the print server 105 onto the memory 253 and executing the program.

The processing illustrated in FIG. 4A is described with regard to an example of processing in which the print service 351 transmits an authentication token in response to an authentication request. FIG. 4A illustrates processing corresponding to steps S1401 to S1403 illustrated in FIG. 14 and steps S1518 to S1520 illustrated in FIG. 15. The flow illustrated in FIG. 4A is started in response to the print service 351 receiving an authentication request from an external device via the network 109.

First, in step S4001, the account management unit 35101 receives an authentication request. The received authentication request includes a user name and a password.

In step S4002, the account management unit 35101 performs authentication processing with use of the received user name and password. The account management unit 35101 refers to the account information illustrated in FIG. 12A and specifies a user corresponding to the received user name and password.

Next, in step S4003, the account management unit 35101 determines an authentication result. If, in step S4003, the authentication result indicates success (SUCCESS in step S4003), then in step S4005, the account management unit 35101 transmits an authentication token to a device or service from which the authentication request has been transmitted. In a case where the device from which the authentication request has been transmitted is the printer 108, the print service 351 transmits the authentication token to the printer 108. On the other hand, in a case where the service from which the authentication request has been transmitted is the print plug-in service 331, the print service 351 transmits the authentication token to the print plug-in service 331.

On the other hand, if, in step S4003, the authentication result indicates failure (FAILURE in step S4003), then in step S4004, the account management unit 35101 performs error processing such as transmitting an error message as a response.

FIG. 4B illustrates an example of processing which the print service 351 performs to register a device and generate a print queue in response to a device registration request. This is processing corresponding to steps S1404 to S1405 illustrated in FIG. 14.

The flow illustrated in FIG. 4B is started with step S4101 by the print service 351 receiving a device registration request from an external device via the network 109.

First, in step S4101, the device management unit 35102 receives a device registration request and the authentication token. In step S4102, the account management unit 35101 analyzes the content of the token received together with the device registration request. In step S4103, the account management unit 35101 determines an analysis result of the token. If it is determined that the received token is valid (YES in step S4103), the account management unit 35101 performs processing in step S4105. If it is determined that the received token is invalid or unauthorized (NO in step S4103), the account management unit 35101 performs processing in step S4104.

In step S4105, the account management unit 35101 specifies a tenant to which a user having an account corresponding to the token received in step S4101 belongs. The account management unit 35101 refers to the account information illustrated in FIG. 12A and specifies a tenant ID to which the user belongs.

Next, in step S4106, the device management unit 35102 generates a print queue for the printer designated by a device ID, in a target tenant region allocated to the storage unit 254 of the print server 105.

Then, in step S4107, the account management unit 35101 updates the account information by adding the ID of the generated print queue to the account information (FIG. 12A). With this processing, the user ID, the printer ID, and the print queue ID are associated with each other.

This enables associating even the physically same device with print queues different for respective use purposes and, thus, distinguishing between printing operations for respective use purposes.

For example, it is possible to associate the same printer A with each of a print queue A for the company A and a print queue B for the company B, and it becomes possible to determine that a print job printed via the print queue A is a printing operation that is based on a business for the company A.

On the other hand, if, in step S4103, it is determined that the authentication token is not valid (NO in step S4103), then in step S4104, the print service 351 performs error processing, such as transmitting an error message as a response.

Next, processing for executing a print plug-in service to perform printing via the web conferencing application 311 is described. The processing illustrated in FIGS. 6A and 6B is implemented by the CPU 252 loading a program for the print plug-in service 331 stored in the storage unit 234 of the print plug-in server 103 onto the 233 and executing the program.

Figure 6A:
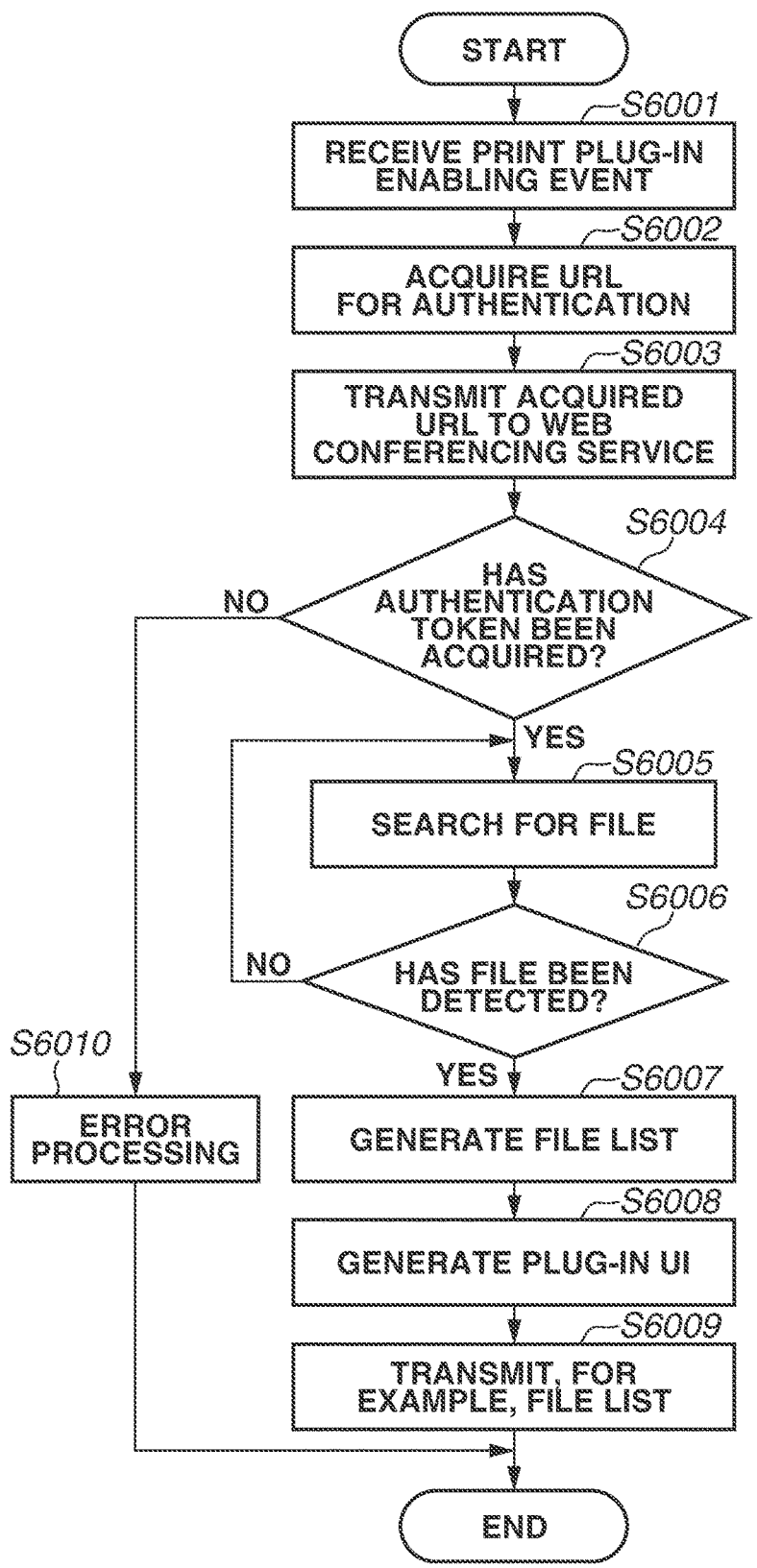
FIGS. 6A and 6B are flowcharts illustrating examples of processing operations of a print plug-in service according to the first exemplary embodiment.

The processing illustrated in FIG. 6A is an example of processing which is performed when the print plug-in service 331 has received a print plug-in enabling event, which indicates enabling of a print plug-in, from the web conferencing service 321.

The flow illustrated in FIG. 6A is started with step S6001 as a result of the print plug-in service 331 receiving the print plug-in enabling event from the web conferencing service 321 via the network 109. The processing illustrated in FIG. 6A is processing corresponding to steps S1509 to S1523.

First, in step S6001, the print plug-in I/F unit 33104 receives a print plug-in enabling event from the web conferencing service 321. In step S6002, the print plug-in I/F unit 33104 transmits an authentication request to the print service 351, and acquires a URL for displaying a screen for authentication. In step S6003, the print plug-in I/F unit 33104 transmits the acquired URL to the web conferencing service 321.

In step S6004, the print plug-in I/F unit 33104 determines whether acquisition of an authentication token from the print service 351 in the print service authentication processing is successful. If, in step S6004, it is determined that an authentication token has not been acquired (NO in step S6004), then in step S6010, the print plug-in service 331 performs error processing, such as transmitting an error message as a response. Then, the print plug-in service 331 ends the processing illustrated in FIG. 6A.

On the other hand, if, in step S6004, it is determined that an authentication token has been acquired (YES in step S6004), then in step S6005, the file list generation unit 33101 searches for a file targeted for printing. The file list generation unit 33101 acquires, from the web conferencing service 321, information about files shared in the web conference to which a user who is logging in to the web conferencing service 321 participates. The files shared in the web conference are files shared in URLs in the chat region of the web conference screen illustrated in FIGS. 13A to 13G or files uploaded to the chat region.

Then, in step S6006, the file list generation unit 33101 determines whether a file targeted for printing has been detected as a result of searching. If, in step S6006, it is determined that a file targeted for printing "has not been detected" (NO in step S6006), the file list generation unit 33101 performs file search in step S6005 again after a predetermined time. In a case where a file targeted for printing has not been acquired even if file search has been performed a predetermined number of times, the file list generation unit 33101 determines that it is impossible to acquire a file targeted for printing, and then ends the processing illustrated in FIG. 6A. If, in step S6006, it is determined that a file targeted for printing "has been detected" (YES in step S6006), then in step S6007, the file list generation unit 33101 generates a list of detected files.

Additionally, in step S6008, the additional UI generation unit 33102 generates a print plug-in UI, which is to be added to the web conferencing service 321 as a print plug-in, such as a printing button and print settings.

Then, in step S6009, the additional UI generation unit 33102 transmits the generated list of files and the generated print plug-in UI to the web conferencing service 321.

Figure 6B:
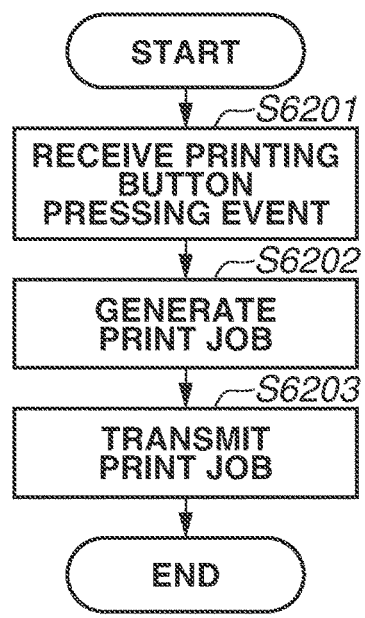

The processing illustrated in FIG. 6B is an example of processing which is performed when the print plug-in service 331 has received a printing button pressing event. The flow illustrated in FIG. 6B is started in response to information indicating that the button 1324 has been selected in the screen illustrated in FIG. 13D being communicated to the print plug-in service 331.

First, in step S6201, the print job generation unit 33103 receives a printing button pressing event from the web conferencing service 321. In step S6202, the print job generation unit 33103 acquires a file targeted for printing from the web conferencing service 321 or the storage service 341, and thus generates a print job.

Then, in step S6203, the print job generation unit 33103 transmits the generated print job and the authentication token to the print service 351. Furthermore, a configuration in which, in a case where the print plug-in service 331 does not have an access token for the print service 351 after step S6201, the print plug-in service 331 performs processing in steps S6001 to S6004 again to acquire an authentication token can be employed.

Furthermore, in the first exemplary embodiment, the print plug-in service 331 transmits an authentication request to the print service 351, and the print service 351 generates an authentication UI. A configuration in which, instead of the print service 351, the print plug-in service 331 generates a UI used for receiving information for authentication and information input to the UI is used to log in to the print service 351 can be employed.

FIGS. 7A and 7B illustrate an example of processing which is performed by the web conferencing service 321. The processing illustrated in FIGS. 7A and 7B is implemented by a CPU 222 of the web conferencing server 102 loading a program for the web conferencing service 321 stored in the storage unit 224 onto a memory 223 of the web conferencing server 102 and executing the program. The processing illustrated in FIG. 7A is an example of processing performed when the web conferencing service 321 has enabled a print plug-in.

The flow illustrated in FIG. 7A is started with step S7001 as a result of the web conferencing service 321 receiving, via the network 109, event information indicating that a print plug-in has been enabled by a user operation in the web conferencing application 311.

In step S7001, the web conferencing application I/F unit 32105 transmits the received print plug-in enabling event information to the print plug-in service 331.

In step S7002, the web conferencing application I/F unit 32105 receives, from the print plug-in service 331, a URL for accessing an authentication UI for logging in to the print service 351.

In step S7003, the UI display unit 32107 accesses the URL of the authentication UI received via the web conferencing application 311 and displays the authentication UI.

In step S7004, the UI display unit 32107 receives inputting of authentication information from the user via the web conferencing application 311, and transmits the received authentication information to the print service 351.

In step S7005, the print plug-in service I/F unit 32106 receives an authentication result provided by the print service 351 via the print plug-in service 331, and determines whether authentication is successful. If, in step S7005, it is determined that the authentication result indicates "failure" (FAILURE in step S7005), then in step S7006, the print plug-in service I/F unit 32106 performs error processing, such as displaying an error message, via the web conferencing application 311. If, in step S7005, it is determined that the authentication result indicates "success" (SUCCESS in step S7005), then in step S7007, the print plug-in service I/F unit 32106 receives a print plug-in UI from the print plug-in service 331.

Then, in step S7008, the UI display unit 32107 displays the print plug-in UI via the web conferencing application 311. With this processing, a screen illustrated in FIG. 13D is displayed.

In step S7009, the UI display unit 32107 waits for a print plug-in UI operation to be performed by the user. If, in step S7010, it is determined that the detected print plug-in UI operation is closing of the print plug-in UI (YES in step S7010), the UI display unit 32107 ends the processing. An instruction for closing the print plug-in UI is issued by the user operating a button (not illustrated). If, in step S7010, it is determined that the detected print plug-in UI operation is other than closing (NO in step S7010), then in step S7011, the UI display unit 32107 displays a screen corresponding to the user operation. After that, the UI display unit 32107 returns the processing to step S7009.

The processing illustrated in FIG. 7B is an example of processing performed at the time of pressing of the printing button as an example of selectable UI processing performed in step S7011 illustrated in FIG. 7A.

The flow illustrated in FIG. 7B is started with step S7101 as a result of the web conferencing service 321 detecting a UI operation other than closing of the UI in step S7010 illustrated in FIG. 7A.

First, in step S7101, the UI display unit 32107 determines whether the detected UI operation is pressing of the printing button. If, in step S7101, it is determined that the detected UI operation is not pressing of the printing button (NO in step S7101), the UI display unit 32107 performs processing corresponding to the performed operation. If, in step S7101, it is determined that the detected UI operation is pressing of the printing button (YES in step S7101), then in step S7102, the print plug-in service I/F unit 32106 transmits event information indicating pressing of the printing button to the print plug-in service 331.

FIGS. 5A and 5B illustrate an example of processing which is performed by the print service 351. The processing illustrated in FIGS. 5A and 5B are implemented by the CPU 252 loading a program for the print service 351 stored in the storage unit 254 of the print server 105 onto the memory 253 and executing the program.

The processing illustrated in FIG. 5A is an example of processing performed when the print service 351 has received a print job. The flow illustrated in FIG. 5A is started with step S5001 as a result of the print service 351 receiving a print job from an external device via the network 109.

First, in step S5001, the print management unit 35103 receives a print job. In step S5002, the account management unit 35101 analyzes an authentication token, which has been received together with the print job.

Next, in step S5003, the account management unit 35101 determines whether the authentication token is a valid token.

If, in step S5003, it is determined that the authentication token is invalid (NO in step S5003), then in step S5004, the account management unit 35101 performs error processing, such as transmitting an error message as a response.

If it is determined that authentication token is a valid token (YES in step S5003), then in step S5005, the print management unit 35103 stores the received print job in a print queue associated with the account information.

Next, in step S5006, the print management unit 35103 checks whether there is a reception of a print job request from an external device via the network 109. The print job request in step S5006 is a request made by the printer 108 to acquire a print job preliminarily stored in the print service 351.

Next, in step S5007, the print management unit 35103 determines whether the print job request has been received. If, in step S5007, it is determined that the print job request has been received (YES in step S5007), then in step S5008, the print management unit 35103 performs print job request responsive processing. If, in step S5007, it is determined that the print job request has not been received (NO in step S5007), then in step S5009, the print management unit 35103 checks a retention time of the print job retained in the print queue.

Then, in step S5010, the print management unit 35103 determines whether the retention time of the print job has exceeded a predetermined specified time.

If it is determined that the retention time of the print job has exceeded the specified time (YES in step S5010), then in step S5011, the print management unit 35103 deletes the corresponding print job from within the print queue. If it is determined that the retention time of the print job is still within the specified time (NO in step S5010), the print management unit 35103 returns the processing to step S5006 to wait for reception of a print job request.

The processing illustrated in FIG. 5B is an example of the print job request responsive processing which the print service 351 performs. The flow illustrated in FIG. 5B is started with step S5101 as a result of the print service 351 receiving a print job request from an external device via the network 109.

In step S5101, the print management unit 35103 receives a print job request. In step S5102, the account management unit 35101 analyzes an authentication token, which is received together with the print job request. The authentication token to be analyzed here is an authentication token acquired from the printer 108.

Next, in step S5103, the account management unit 35101 determines whether the authentication token is a valid token. If the authentication token is a valid token, authentication is successful, and, if the authentication token is an invalid token, authentication is failed. If, in step S5103, it is determined that authentication is failed (NO in step S5103), then in step S5104, the print management unit 35103 performs error processing, such as transmitting an error message as a response.

On the other hand, if, in step S5103, it is determined that authentication is successful (YES in step S5103), then in step S5105, the print management unit 35103 specifies a print queue associated with the account information.

Next, in step S5106, the print management unit 35103 transfers the print job to the printer 108, which is a print job request source.

Next, in step S5107, the print security management unit 35104 stores a log concerning transfer of the print job in a region allocated in the storage unit 254 of the print server 105.

In step S5108, the print management unit 35103 generates business-use printing information. The print management unit 35103 generates business-use printing information illustrated in FIG. 12B. A device ID included in the business-use printing information is the device ID of a printer which serves as a transmission destination of the print job. A user ID included in the business-use printing information is identification information about a user who has logged in to the print service 351 via the printer 108. A tenant ID is information indicating a tenant to which a user who has logged in to the print service 351 belongs. The number of consumed sheets of paper is information indicating the number of sheets of paper used for printing which is estimated based on print data. The consumed amount of ink/toner is information indicating the consumed amount of ink or toner which is calculated based on print data and print settings preliminary stored in the print service 351. For example, what percent of toner or ink of the cartridge has been used in printing of the applicable print data is stored as the consumed amount of ink/toner in the business-use printing information.

In step S5109, the print management unit 35103 transmits, as a cost processing request, the business-use printing information to the printer management service 361. The printer management service 361 refers to the device ID included in the business-use printing information and the device information which the printer management service 361 stores, and specifies to a user of what user ID to pay the cost or what is the delivery destination of a consumable. While, in the first exemplary embodiment, the device ID is used as a key to specify a user ID as a payment recipient or specify the delivery destination of a consumable, a configuration in which the printer management service 361 determines a payment recipient or the delivery destination of a consumable based on a user ID included in the business-use printing information can be employed.

Figure 8A:
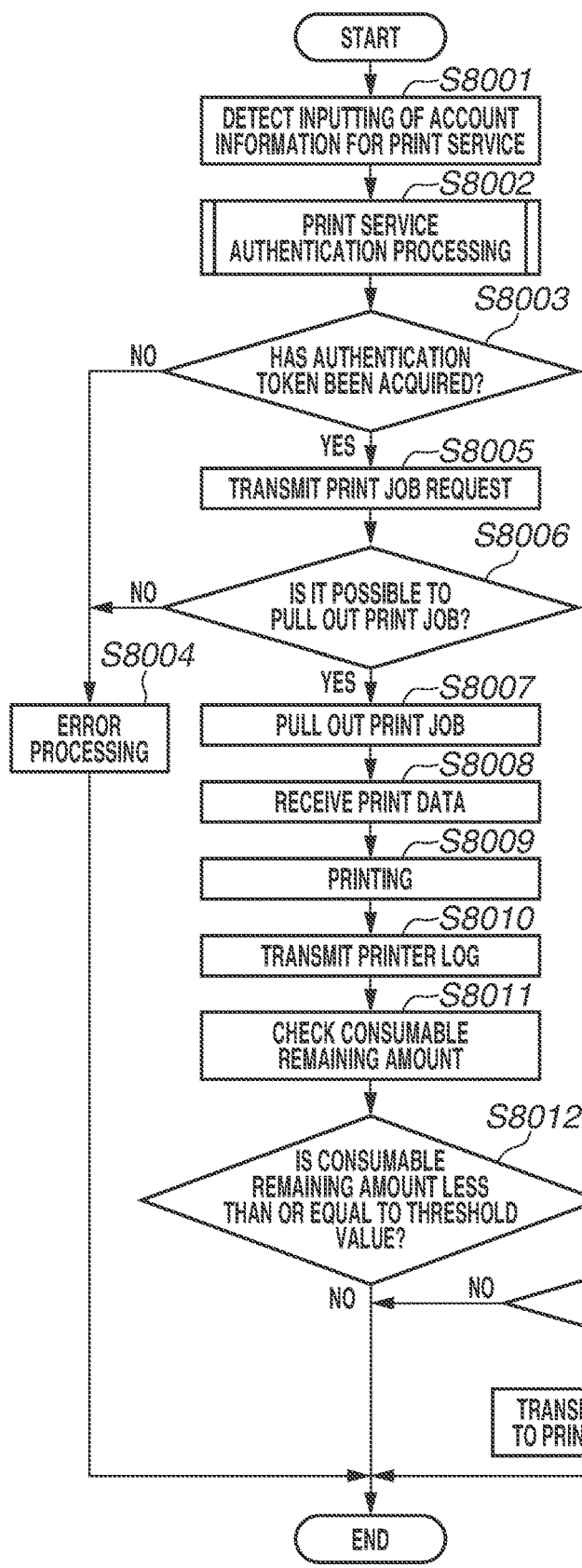
FIGS. 8A and 8B are flowcharts illustrating examples of processing operations of the printer according to the first exemplary embodiment and a second exemplary embodiment, respectively.
Figure 8B:
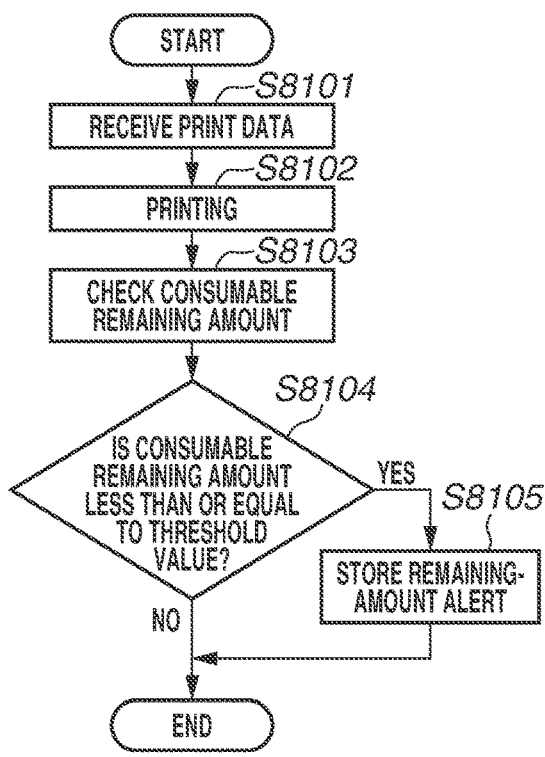

FIGS. 8A and 8B illustrate an example of processing which is performed by the printer 108. The processing illustrated in FIGS. 8A and 8B are implemented by the CPU 282 loading a program for the device control unit 381 stored in the storage unit 284 of the printer 108 onto the memory 283 and executing the program.

The processing illustrated in FIG. 8A is an example of processing performed when the printer 108 is compatible with the print service 351 and the printer management service 361 in the first exemplary embodiment.

The flow illustrated in FIG. 8A is started with step S8001 as a result of the user inputting account information for the print service 351 via the UI of the printer 108.

First, in step S8001, the print service I/F unit 38106 detects inputting of account information for the print service 351. In step S8002, the print service I/F unit 38106 performs print service authentication processing. Specifically, in step S8002, the print service I/F unit 38106 transmits the input user name and password and an authentication request to the print service 351. Then, in a case where authentication performed by the print service 351 is successful, the print service I/F unit 38106 acquires an authentication token. In a case where authentication performed by the print service 351 is failed, the print service I/F unit 38106 receives an error notification from the print service 351.

Next, in step S8003, the print service I/F unit 38106 determines whether an authentication token has been acquired as a result of authentication processing. If, in step S8003, it is determined that an authentication token has not been acquired (NO in step S8003), then in step S8004, the print service I/F unit 38106 performs error processing, such as displaying an error message on the UI of the printer 108. If, in step S8003, it is determined that an authentication token has been acquired (YES in step S8003), then in step S8005, the print service I/F unit 38106 transmits a print job request to the print service 351. Specifically, in step S8005, the print service I/F unit 38106 uses the acquired authentication token to transmit an acquisition request for a print job corresponding to the user who is logging in to the print service 351. Then, in step S8006, the print service I/F unit 38106 determines whether it is possible to pull out a print job from the print service 351. If, in step S8006, it is determined that it is impossible to pull out a print job (NO in step S8006), then in step S8004, the print service I/F unit 38106 performs error processing, such as displaying an error message on the UI of the printer 108. An example in which, regardless of authentication being successful, it becomes impossible to pull out a print job includes a case in which, for example, the time of retention of a print job in the print service 351 exceeds a specified time and a print job is forced to be deleted from the viewpoint of security. Moreover, in a case where, although the user has logged in to the print service 351 via the printer 108, the print service 351 is not retaining a print job corresponding to the logged-in user, it is also determined that it is impossible to pull out a print job. If, in step S8006, it is determined that it is possible to pull put a print job (YES in step S8006), then in step S8007, the print service I/F unit 38106 pulls out a print job from the print service 351.

In step S8008, the print service I/F unit 38106 receives, as print data, the print job pulled out from the print service 351. In step S8009, the print output unit 38102 performs printing on a sheet of paper.

In step S8010, the print service I/F unit 38106 transmits, as a printer log, information about a printing result to the print service 351. The log to be transmitted to the print service 351 in step S8010 can be a part or the whole of log information illustrated in FIG. 12C.

Additionally, in step S8011, the consumable management unit 38103 checks a consumable remaining amount obtained after printing. In step S8012, the consumable management unit 38103 determines whether the consumable remaining amount is less than or equal to a predetermined threshold value. If, in step S8012, it is determined that the consumable remaining amount is not less than or equal to the threshold value (NO in step S8012), the consumable management unit 38103 ends a series of processing. If it is determined that the consumable remaining amount is less than or equal to the threshold value (YES in step S8012), then in step S8013, the consumable request transmission unit 38104 determines whether the cost processing form is "2". In the first exemplary embodiment, in a case where the cost processing form is "1", the cost of a consumable occurring as a result of printing for business is preliminarily paid by the user for another and is then separately billed to a company. Moreover, in a case where the cost processing form is "2", a company places an order for a consumable occurring as a result of printing for business to a delivery agent and the company burdens the cost of the consumable. An example of a determination method for the cost processing form in step S8013 includes a method of making a determination based on whether information about the printer management service 361 is currently registered with the printer 108. In a case where information about the printer management service 361 is not currently registered with the printer 108, since a processing form in which the cost of a consumable is temporarily paid by the user is used, the consumable request transmission unit 38104 determines that the cost processing form is "1". On the other hand, in a case where information about the printer management service 361 is currently registered with the printer 108, since a processing form in which a company places an order for a consumable to a delivery agent and then delivers the consumable to the user is used, the consumable request transmission unit 38104 determines that the cost processing form is "2". The cost processing form of the printer 108 can also be determined based on, besides the above-mentioned method, a method in which a cost processing form is set to the printer 108 beforehand and it is determined whether the cost processing form set to the printer 108 is "2" by referring to such a setting. Moreover, while, in the above-mentioned method, it is supposed that the cost processing form differs for each printer 108, a configuration in which the cost processing form is able to be set for each user can be employed. In that case, the printer management service 361 is registered for each user who logs in to the printer 108 and, in a case where the printer management service 361 corresponding to the logged-in user is currently registered with the printer 108, the consumable request transmission unit 38104 determines that the cost processing form is "2". If, in step S8013, it is determined that the cost processing form is "2" (YES in step S8013), then in step S8014, the consumable request transmission unit 38104 transmits a consumable request to the printer management service 361.

Furthermore, in the first exemplary embodiment, the cost processing form is discriminated based on whether information about the printer management service 361 is currently registered with the printer 108. A configuration in which the user sets the cost processing form to the printer 108 can also be employed. The cost processing form can be set for each device or can be set for each user.

FIGS. 10A to 10E illustrate an example of processing which is performed by the printer management service 361.

The processing illustrated in FIGS. 10A to 10E are implemented by the CPU 262 loading a program for the printer management service 361 stored in the storage unit 264 of the printer management server 106 onto the memory 263 and executing the program. The processing illustrated in FIG. 10A is an example of processing performed when the printer management service 361 has received a cost processing request from the print service 351. The flow illustrated in FIG. 10A is started with step S10001 as a result of the printer management service 361 receiving a cost processing request from the printer management service 361.

First, in step S10001, the cost processing unit 36102 receives a cost processing request from the print service 351. The cost processing request includes business-use printing information illustrated in FIG. 12B.

In step S10003, the cost processing unit 36102 performs cost calculation processing, such as calculation of the consumed amount of a consumable and calculation of the breakdown of costs. Details of the processing in step S10003 are described below with reference to FIG. 10B.

Then, in step S10004, the cost processing unit 36102 determines the cost processing form employed in a target printer. In the first exemplary embodiment, in a case where the cost processing form is "1", a form in which the user temporarily pays the cost of a consumable occurring as a result of printing for business for another and then separately bills a company is employed. Moreover, in a case where the cost processing form is "2", a form in which a company places an order for a consumable occurring as a result of printing for business to a delivery agent and bares the cost of the consumable is employed. The printer management service 361 is managing device information illustrated in FIG. 12G, and refers to a cost processing form included in the device information about a device ID included in the business-use printing information to determine the cost processing form. Besides the above-mentioned method, a configuration in which the print service 351 manages the cost processing form for each user or for each device and the printer management service 361 receives the cost processing form together with the business-use printing information can be employed.

If, in step S10004, it is determined that the cost processing form is "1" (FORM 1 in step S10004), then in step S10005, the cost processing unit 36102 determines that a processing form in which the user temporarily pays the cost of a consumable for another is employed and, thus, the cost processing unit 36102 performs settlement processing. Details of the processing in step S10005 are described below with reference to FIG. 10C.

On the other hand, if, in step S10004, it is determined that the cost processing form is "2" (FORM 2 in step S10004), the cost processing unit 36102 determines that a processing form in which a company places an order for a consumable and delivers the consumable to the user is employed. Then, in step S10006, the consumable management unit 36101 refers to the consumable request flag and determines whether a consumable request has already been received. If, in step S10006, it is determined that a consumable request has already been received (YES in step S10006), then in step S10007, the order placement processing unit 36103 performs order placement processing for a consumable.

On the other hand, if, in step S10006, it is determined that the printer management service 361 has not yet received a consumable request (NO in step S10006), then in step S10008, the cost processing unit 36102 stores a cost calculation result in a region allocated in the storage unit 264 of the printer management server 106.

Furthermore, in the above description, after receiving a cost processing request in step S10001, the cost processing unit 36102 is configured to advance the processing to step S10003. The cost processing unit 36102 can be configured to, after step S10001, compare a company obtained from a tenant ID included in the business-use printing information and tenant information stored in the printer management service 361 with a company specified based on a device ID included in the business-use printing information and tenant information stored in the printer management service 361. Then, the cost processing unit 36102 can be configured to, in a case where the companies determined in both methods by the printer management service 361 are the same, transmit cost billing information to the company. This is processing for confirming whether there is no error in the transmission destination of cost billing information.

The processing illustrated in FIG. 10B is an example of cost calculation processing performed by the printer management service 361. The flow illustrated in FIG. 10B is started after a cost processing request is received from the print service 351 in the flow illustrated in FIG. 10A.

First, in step S10501, the cost processing unit 36102 extracts the number of consumed sheets of paper and the consumed amount of ink/toner from the business-use printing information received from the print service 351.

Then, in step S10502, the cost processing unit 36102 calculates a cost from the consumed amount for each type of consumable. The printer management service 361 previously stores cost information for each consumable. For example, the printer management service 361 has a table in which the amount of money per sheet of paper and the amount of money per one toner cartridge or ink cartridge are stored. The cost processing unit 36102 calculates a cost concerning printing which the user has used for business, based on the table, the number of consumed sheets of paper and the consumed amount of ink/toner included in the business-use printing information, and the paper type and the ink/toner type included in the device information. For example, the amount of money of the consumed sheets of paper is expressed by a product of the amount of money per sheet of paper and the number of consumed sheets of paper. Moreover, the charge of used toner is calculated based on the amount of money of one toner cartridge and the percentage of consumed toner. The method of calculating the amount of money of a consumable used for business is not limited to the above-mentioned method.

The processing illustrated in FIG. 10C is an example of settlement processing performed by the printer management service 361. The flow illustrated in FIG. 10C is started with step S10301 as a result of the cost processing form being determined to be "1", i.e., a processing form in which the user preliminarily pays the cost of a consumable for another, in step S10004 illustrated in FIG. 10A.

First, in step S10301, the cost processing unit 36102 generates cost billing information. FIG. 12J illustrates an example of cost billing information which the cost processing unit 36102 generates. The cost billing information includes, in addition to a device ID, a tenant ID, and a user ID, the name of a consumable targeted for cost billing, the consumed amount of the consumable used for business, the cost of the consumable used for business, and the total amount of money. The consumed amount and the cost of the consumable used for business are values calculated in step S10003. A user ID included in the cost billing information is identification information about a user who serves as a payment recipient of the cost of a consumable, and is a user ID specified by device information which the printer management service 361 manages with the device ID included in the business-use printing information used as a key.

Then, in step S10302, the cost processing unit 36102 transmits the cost billing information to a company. Specifically, the cost processing unit 36102 specifies a company serving as a billing destination based on the tenant ID included in the business-use printing information and the tenant information stored in the printer management service 361. The cost processing unit 36102 transmits the cost billing information generated in step S10301 to the specified company. The cost preliminarily paid by the user for another is able to be paid by the company which has received the cost billing information paying the cost to a user of the user ID included in the cost billing information. Furthermore, in the first exemplary embodiment, each time printing is performed, the printer management service 361 receives business-use printing information from the print service 351, performs settlement processing, and transmits cost billing information to a company which will actually pay the cost. Instead, a configuration in which the printer management service 361 calculates the sum of the amounts of money of consumables consumed for business-use printing within a predetermined period based on business-use printing information received from the print service 351 within the predetermined period and transmits the sum as cost billing information to the company in step S10005 can be employed.

The processing illustrated in FIG. 10D is an example of order placement processing performed by the printer management service 361. The flow illustrated in FIG. 10D is started with step S10101 as a result of the consumable request being determined to have already been received in step S10006 illustrated in FIG. 10A.

First, in step S10101, the order placement processing unit 36103 specifies a target consumable based on consumable request information (FIG. 12I). The consumable request information is acquired from the printer 108 in step S8014 illustrated in FIG. 8A. The consumable request information includes a printer ID of the applicable printer.

Next, in step S10102, the order placement processing unit 36103 generates order placement information for the consumable. FIG. 12D is a diagram illustrating an example of order placement information which the order placement processing unit 36103 generates. The order placement processing unit 36103 generates order placement information with use of business-use printing information and device information acquired from the print service 351 and user information stored in the printer management service 361.

Then, in step S10103, the order placement processing unit 36103 transmits the order placement information to the order receipt management service 371.

Next, in step S10104, the order placement processing unit 36103 waits for delivery cost billing information to be received from the order receipt management service 371.

An example of the delivery cost billing information includes, for example, a device ID, a tenant ID, a user ID, a consumable, the amount of consumable, the cost of consumable, a delivery location address, a shipping cost, and a total cost (FIG. 12E).

Then, in step S10105, the order placement processing unit 36103 determines whether the delivery cost billing information has been received from the order receipt management service 371. If, in step S10105, it is determined that the delivery cost billing information has been received from the order receipt management service 371 (YES in step S10105), then in step S10106, the order placement processing unit 36103 performs settlement processing based on the received delivery cost billing information and a result obtained by the cost calculation processing.

Next, in step S10107, the order placement processing unit 36103 deducts the amount of money of the delivered consumable from the cost calculation result stored in a region allocated in the storage unit 264 of the printer management server 106 in step S10008. Then, in step S10108, the order placement processing unit 36103 turns off the consumable request flag. With the above processing performed, instead of the user, the printer management service 361 becomes able to place an order for a consumable and request a company to perform cost settlement thereof.

The processing illustrated in FIG. 10E is an example of processing performed when the printer management service 361 has received a consumable request before a cost processing request. The flow illustrated in FIG. 10E is started with step S10201 as a result of the printer management service 361 receiving a consumable request.

First, in step S10201, the order placement processing unit 36103 receives consumable request information from the printer 108. In step S10202, the order placement processing unit 36103 specifies information about a user and a company, which serves as a burden source for the cost of a consumable, by performing matching between a device ID included in the consumable request information and user information already registered with the printer management service 361.

Next, in step S10203, the order placement processing unit 36103 turns on a consumable request flag, which indicates that the consumable request has been received.

Then, in step S10204, the order placement processing unit 36103 determines whether a cost calculation result has already been stored. The cost calculation result is information which is stored in the storage unit 264 of the printer management server 106 in step S10008. If, in step S10204, it is determined that the cost calculation result has already been stored (YES in step S10204), then in step S10205, the order placement processing unit 36103 performs order placement processing. The order placement processing in step S10205 is order placement processing similar to the order placement processing described with reference to FIG. 10D.

On the other hand, if, in step S10204, it is determined that the cost calculation result has not yet been stored (NO in step S10204), then in step S10206, the order placement processing unit 36103 waits for reception of business-use printing information.

Then, in step S10207, the printer management service 361 determines whether the business-use printing information has been received. If, in step S10207, it is determined that the business-use printing information has been received (YES in step S10207), the order placement processing unit 36103 advances the processing to the cost calculation processing (step S10003 illustrated in FIG. 10A).

FIG. 11 illustrates an example of processing performed by the order receipt management service 371. The processing illustrated in FIG. 11 is implemented by the CPU 272 loading a program for the order receipt management service 371 stored in the storage unit 274 of the order receipt server 107 onto the memory 273 and executing the program. The processing illustrated in FIG. 11 is an example of processing performed when the order receipt management service 371 receives an order for purchase and delivery of a consumable from the printer management service 361.

The flow illustrated in FIG. 11 is started with step S1101 as a result of the order receipt management service 371 receiving order placement information from the printer management service 361.

First, in step S1101, the order receipt management unit 37101 receives order placement information from the printer management service 361. Specifically, in step S1101, the order receipt management unit 37101 receives order placement information illustrated in FIG. 12D from the printer management service 361. Then, in step S1102, the delivery management unit 37102 delivers a consumable in conformity with the content of the order placement information.

In step S1103, the delivery cost billing unit 37103 calculates, for example, the cost of a consumable for which an order has been received and a delivery cost thereof. Then, in step S1104, the delivery cost billing unit 37103 generates delivery cost billing information based on a result of the calculation. The delivery cost billing information is information illustrated in FIG. 12E. Then, in step S1105, the delivery cost billing unit 37103 transmits the generated delivery cost billing information to the printer management service 361.

As described above, the print plug-in service 331, the print service 351, the printer 108, the printer management service 361, and the order receipt management service 371 performing processing in cooperation with each other enable an audience to readily print a conference material file in, for example, a web conference.

Moreover, the printer management server 106 acquiring business-use printing information from a cloud print service and performing cost processing and automatic order placement processing enables facilitating settlement of the cost of a consumable used in printing and the cost used for business even in purchase thereof.

In the first exemplary embodiment, an example of a method in which the device control unit 381 of the printer 108 directly receives print data from the print service 351 and directly transmits a consumable request to the printer management service 361 has been described. A case where the printer 108 is not compatible with the print service 351 or the printer management service 361 is conceivable.

In a second exemplary embodiment, a virtual device application 313 is installed on a client terminal 110, and the virtual device application 313 communicates with the print service 351 and the printer management service 361. Then, the virtual device application 313 transmits a print job acquired from the print service 351 to the printer 108 and causes the printer 108 to perform printing. Additionally, the virtual device application 313 acquires a remaining-amount alert for a consumable from the printer 108, and transmits information about the remaining-amount alert to the printer management service 361.

Specific processing in the second exemplary embodiment is described with reference to FIG. 8B and FIG. 9.

Furthermore, here, only differences from the first exemplary embodiment are described.

With regard to a system configuration, a hardware/software configuration, and processing flows thereof, portions similar to those in the first exemplary embodiment are omitted from description.

FIG. 3E is a block diagram illustrating a software configuration of the virtual device application 313. The virtual device application 313 is a configuration of software for use in the second exemplary embodiment.

A print job reception unit 31301 receives a print job transmitted from an external device via the network 109, and stores the received print job in the storage unit 214 of the client terminal 110.

In a case where the actual printer 108 is not able to process the PDL of a print job received from an external device, a print data conversion unit 31302 converts the PDL of the received print job into a PDL which the printer 108 is able to process.

A print data transmission unit 31303 transmits a print job received by the virtual device application 313 or a print job subjected to conversion to the printer 108.

A connected device management unit 31304 manages association between the virtual device application 313 and the actual printer 108.

A printer management service I/F unit 31305 processes exchange of data with the printer management service 361.

A print service I/F unit 31306 processes exchange of data with the print service 351.

First, processing performed by the virtual device application 313 from when the virtual device application 313 acquires a print job from the print service 351 to when the printer 108 completes printing is described with reference to FIG. 9. The processing illustrated in FIG. 9 is implemented by the CPU 212 loading a program for the virtual device application 313 stored in the storage unit 214 of the client terminal 110 onto the memory 213 and executing the program.

Figure 9:
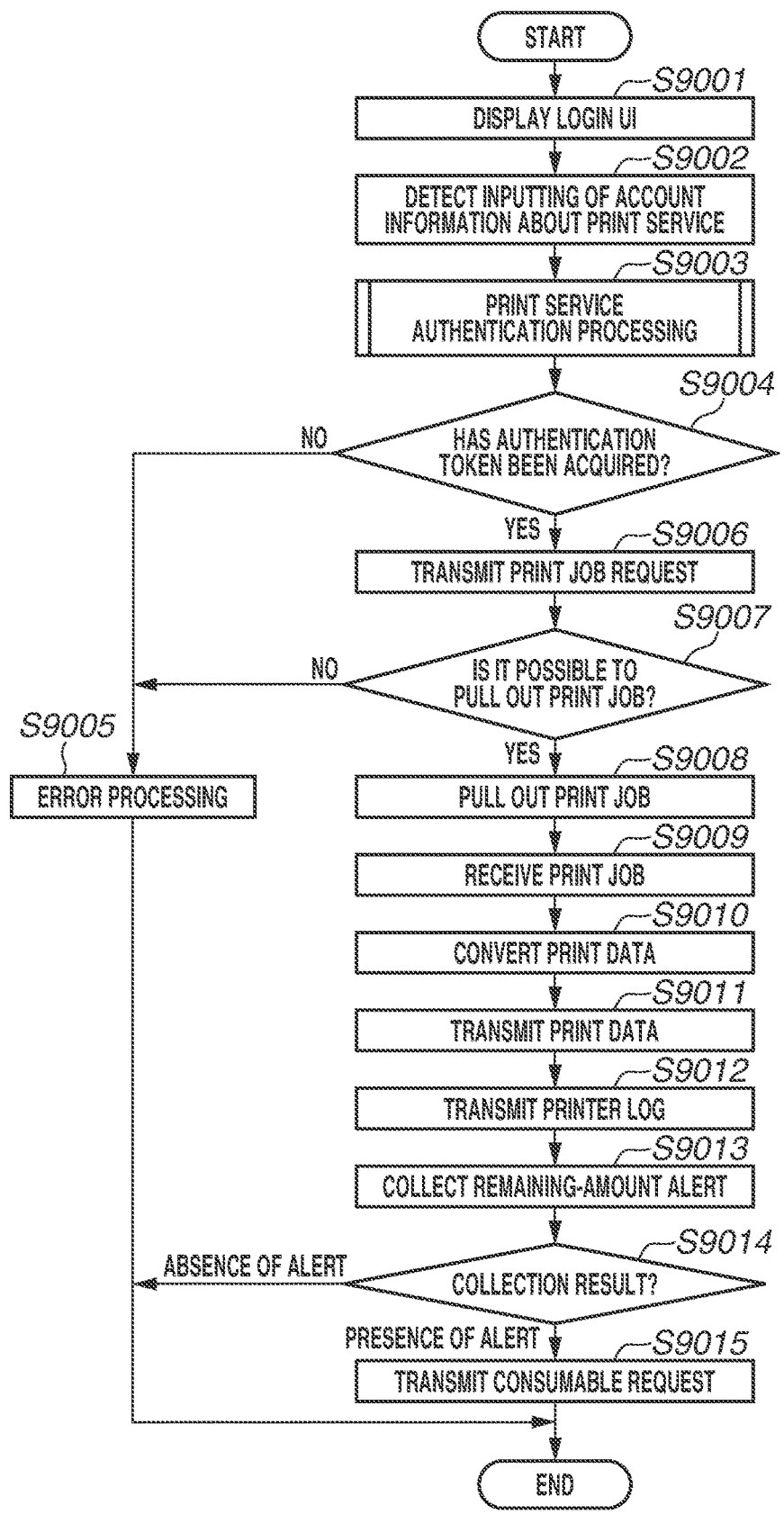
FIG. 9 is a flowchart illustrating an example of a processing operation of a virtual device application according to the second exemplary embodiment.

The processing illustrated in FIG. 9 is performed in a case where the printer 108 is not compatible with the print service 351 and the printer management service 361.

The processing illustrated in FIG. 9 is started by the user operating the client terminal 110 to issue an instruction to activate the virtual device application 313.

First, in step S9001, the print service I/F unit 31306 displays a login UI for inputting account information about the print service 351.

Next, in step S9002, the print service I/F unit 31306 detects inputting of account information about the print service 351. In step S9003, the print service I/F unit 31306 performs print service authentication processing with use of the input account information. In a case where authentication to the print service 351 is successful, the print service I/F unit 31306 receives an authentication token. In a case where authentication to the print service 351 is failed, the print service I/F unit 31306 receives an error notification indicating that authentication is failed.

Next, in step S9004, the print service I/F unit 31306 determines whether an authentication token has been acquired as a result of authentication processing. If, in step S9004, it is determined that an authentication token has not been acquired (NO in step S9004), then in step S9005, the print service I/F unit 31306 performs error processing, such as displaying an error message on the UI of the virtual device application 313.

On the other hand, if, in step S9004, it is determined that an authentication token has been acquired (YES in step S9004), then in step S9006, the print service I/F unit 31306 transmits a print job request to the print service 351.

Then, in step S9007, the print service I/F unit 31306 determines whether it is possible to pull out a print job from the print service 351. Specifically, in step S9007, the print service I/F unit 31306 accesses the print service 351 with use of the authentication token and inquires of the print service 351 whether it is possible to acquire a print job of the user authenticated with the authentication token. The print service I/F unit 31306 determines whether it is possible to pull out a print job, based on a response from the print service 351. If, in step S9007, it is determined that it is impossible to pull out a print job (NO in step S9007), then in step S9005, the print service I/F unit 31306 performs error processing, such as displaying an error message on the UI of the virtual device application 313.

On the other hand, if, in step S9007, it is determined that it is possible to pull out a print job (YES in step S9007), then in step S9008, the print service I/F unit 31306 transmits an acquisition request for a print job to the print service 351 and, thus, pulls out the print job from the print service 351.

Next, in step S9009, the print job reception unit 31301 receives the print job pulled out from the print service 351.

Then, in step S9010, the print data conversion unit 31302 converts the received print job into a print job which is supported by the printer 108.

Next, in step S9011, the print data transmission unit 31303 transmits the print job subjected to conversion to the printer 108.

Then, in step S9012, the print service I/F unit 31306 transmits information about a printing result as a printer log to the print service 351.

Additionally, in step S9013, the connected device management unit 31304 collects, from the printer 108, a remaining-amount alert, which indicates that the remaining amount of a consumable obtained after printing is less than or equal to a threshold value. Specifically, in step S9013, the connected device management unit 31304 transmits an acquisition request for the remaining-amount alert to the printer 108. In a case where the remaining-amount alert is currently stored in the printer 108, the connected device management unit 31304 is able to receive the remaining-amount alert. In a case where the remaining-amount alert is not currently stored in the printer 108, the connected device management unit 31304 does not receive the remaining-amount alert.

Then, in step S9014, the connected device management unit 31304 determines whether the remaining-amount alert has been received from the printer 108. If, in step S9014, it is determined that there is a remaining-amount alert (PRESENCE OF ALERT in step S9014), then in step S9015, the virtual device application 313 transmits a consumable request to the printer management service 361. An example of the consumable request includes, for example, a device ID and a target consumable (FIG. 12I). If, in step S9014, it is determined that the remaining-amount alert has not been received from the printer 108 (ABSENCE OF ALERT in step S9014), the connected device management unit 31304 ends the processing illustrated in FIG. 9.

As described above, according to the second exemplary embodiment, the virtual device application 313, instead of the printer 108, receives print data from the print service 351, and transmits a consumable request to the printer management service 361.

FIG. 8B is a flowchart illustrating an example of processing performed by the printer 108.

The processing illustrated in FIG. 8B is implemented by the CPU 282 loading a program for the device control unit 381 stored in the storage unit 284 of the printer 108 onto the memory 283 and executing the program.

The processing illustrated in FIG. 8B is an example of processing performed in a case where the printer 108 is not compatible with the print service 351 and the printer management service 361 in the second exemplary embodiment.

The flow illustrated in FIG. 8B is started with step S8101 as a result of the printer 108 receiving print data from the virtual device application 313.

First, in step S8101, the print data reception unit 38101 receives print data from the virtual device application 313. Then, in step S8102, the print output unit 38102 performs printing on a sheet of paper. In step S8103, the consumable management unit 38103 checks a consumable remaining amount obtained after printing. Then, in step S8104, the consumable management unit 38103 determines whether the consumable remaining amount is less than or equal to a predetermined threshold value. If, in step S8104, it is determined that the consumable remaining amount is not less than or equal to the threshold value (NO in step S8104), the device control unit 381 ends a series of processing. If, in step S8104, it is determined that the consumable remaining amount is less than or equal to the threshold value (YES in step S8104), then in step S8105, the consumable management unit 38103 stores information indicating that it is necessary to supplement a consumable (remaining-amount alert), in a region allocated in the storage unit 284 of the printer 108. The stored remaining-amount alert is transmitted to the client terminal 110 in response to a request from the virtual device application 313. After transmitting the remaining-amount alert to the client terminal 110, the consumable management unit 38103 clears information about the remaining-amount alert.

As described above, according to the second exemplary embodiment, instead of the printer 108, the virtual device application 313 installed on the client terminal 110 acquires a print job from the print service 351 and then converts the print job into a format which is able to be used by the printer 108. With this configuration, even if the printer 108 is a printer which is unable to acquire a print job from the print service 351 or is unable to interpret the acquired print job, the printer 108 becomes able to perform printing via the print service 351. Moreover, instead of the printer 108, the virtual device application 313 installed on the client terminal 110 notifies the printer management service 361 that the remaining amount of a consumable is small. With this configuration, even if the printer 108 is unable to directly access the printer management service 361, the printer 108 is able to notify the printer management service 361 that the remaining amount of a consumable has become small.

According to exemplary embodiments of the disclosure, with regard to a printing apparatus which may be used for various use applications, the order placement of a consumable and the settlement of a cost corresponding to the used amount of a consumable can be facilitated.

Other Embodiments

The aspect of the embodiments can be implemented by performing the following processing. Specifically, the processing includes supplying software (program) which implements functions of the above-described exemplary embodiments to a system or apparatus via a network or any type of storage medium and causing a computer (or, for example, a CPU or a micro processing unit (MPU)) of the system or apparatus to read out and execute program code. In this case, the computer program and a storage medium storing the computer program configure the aspect of the embodiments.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-141122 filed Aug. 24, 2020, which is hereby incorporated by reference herein in its entirety.

What is claimed is:

1. An image forming apparatus comprising:
a controller configured to:
receive print data from a server system that received the print data from an information processing apparatus;
generate, based on the received print data, information related to a consumable item that was used for business-use printing, wherein the information related to the consumable item is not generated, in a case that print data was received from the information processing apparatus without passing through the server system; and
transmit the generated information.

2. The image forming apparatus according to claim 1, wherein the generated information includes a user identifier corresponding to a user that instructs the information processing apparatus to transmit the print data to the server system.

3. The image forming apparatus according to claim 2, wherein the generated information is transmitted to the server system.

4. The image forming apparatus according to claim 3, wherein the server system specifies a destination of cost information, wherein the cost information is generated based on the generated information.

5. The image forming apparatus according to claim 2, wherein the controller is further configured to:
order a new consumable item based on a remaining amount of the consumable item, in a case that a predetermined setting is enabled.

6. The image forming apparatus according to claim 5, wherein the predetermined setting is a setting indicating that a cost of the new consumable item is defrayed by a user that is different from the user corresponding to the user identifier.

7. The image forming apparatus according to claim 1, wherein the information includes a number of sheets that is used for printing based on the received print data.

8. The image forming apparatus according to claim 7, wherein the number of sheets is to be used for specifying a cost of the consumable item that was used for business-use printing based on the print data received from the server system.

9. A method for controlling an image forming apparatus that receives print data from an information processing apparatus without passing through a server system and print based on the received print data, the method comprising:
receiving print data from the server system that received the print data from an information processing apparatus;

generating, based on the received print data, information related to a consumable item that was used for business-use printing, in a case that print data was received from the information processing apparatus without passing through the server system; and transmitting the generated information.

10. The method according to claim 9, wherein the generated information includes a user identifier corresponding to a user that instructs the information processing apparatus to transmit the print data to the server system.

11. The method according to claim 10, wherein the generated information is transmitted to the server system.

12. The method according to claim 11, wherein the server system specifies a destination of cost information based on the generated information, wherein the cost information is generated based on the generated information.

13. The method according to claim 10, wherein the method is further comprising:
ordering a new consumable item based on a remaining amount of the consumable item, in a case that a predetermined setting is enabled.

14. The method according to claim 13, wherein the predetermined setting is a setting indicating that a cost of the new consumable item is defrayed by a user that is different from the user corresponding to the user identifier.

15. The method according to claim 9, wherein the information includes a number of sheets that is used for printing based on the received print data.

16. The method according to claim 15, wherein the number of sheets is to be used for specifying a cost of the consumable item that was used for business-use printing based on the print data received from the server system.

17. A non-transitory computer readable storage medium storing instructions that, when executed by an information processing apparatus, cause the image forming apparatus to perform a method comprising:
receiving print data from a server system that received the print data from an information processing apparatus;
generating, based on the received print data, information related to a consumable item that was used for business-use printing, in a case that print data was received from the information processing apparatus without passing through the server system; and
transmitting the generated information.

18. The non-transitory computer readable storage medium according to claim 17, wherein the generated information includes a user identifier corresponding to a user that instructs the information processing apparatus to transmit the print data to the server system.

19. The non-transitory computer readable storage medium according to claim 18, wherein the generated information is transmitted to the server system.

20. The non-transitory computer readable storage medium according to claim 19, wherein the server system specifies a destination of cost information, wherein the cost information is generated based on the generated information.

21. The non-transitory computer readable storage medium according to claim 18, wherein the method is further comprising:
ordering a new consumable item based on a remaining amount of the consumable item, in a case that a predetermined setting is set.

22. The non-transitory computer readable storage medium according to claim 21, wherein the predetermined setting is a setting indicating that a cost of the new consumable item is defrayed by a user that is different from a user corresponding to the user identifier.

23. The non-transitory computer readable storage medium according to claim 18, wherein the information includes a number of sheets that is used for business-use printing based on the received print data.

24. The non-transitory computer readable storage medium according to claim 23, wherein the number of sheets is to be used for specifying a cost of the consumable item that was used for printing based on the print data received from the server system.

* * * * *